US012177707B2

(12) United States Patent
Matsumura et al.

(10) Patent No.: US 12,177,707 B2
(45) Date of Patent: Dec. 24, 2024

(54) TERMINAL AND RADIO COMMUNICATION METHOD

(71) Applicant: NTT DOCOMO, INC., Tokyo (JP)

(72) Inventors: Yuki Matsumura, Tokyo (JP); Satoshi Nagata, Tokyo (JP); Wenjia Liu, Beijing (CN); Jing Wang, Beijing (CN); Xiaolin Hou, Beijing (CN); Xin Wang, Beijing (CN)

(73) Assignee: NTT DOCOMO, INC., Tokyo (JP)

( * ) Notice: Subject to any disclaimer, the term of this patent is extended or adjusted under 35 U.S.C. 154(b) by 333 days.

(21) Appl. No.: 17/625,939

(22) PCT Filed: Jul. 19, 2019

(86) PCT No.: PCT/JP2019/028496
§ 371 (c)(1),
(2) Date: Jan. 10, 2022

(87) PCT Pub. No.: WO2021/014502
PCT Pub. Date: Jan. 28, 2021

(65) Prior Publication Data
US 2022/0264350 A1 Aug. 18, 2022

(51) Int. Cl.
*H04W 24/10* (2009.01)
*H04W 72/54* (2023.01)

(52) U.S. Cl.
CPC .......... *H04W 24/10* (2013.01); *H04W 72/54* (2023.01)

(58) Field of Classification Search
None
See application file for complete search history.

(56) References Cited

U.S. PATENT DOCUMENTS

2013/0201912 A1 8/2013 Sheng et al.
2015/0009928 A1* 1/2015 Sohn ............... H04L 1/0026
370/329

(Continued)

FOREIGN PATENT DOCUMENTS

| EP | 3471287 A1 | 4/2019 |
| JP | 2015512217 A | 4/2015 |
| WO | 2018030804 A1 | 2/2018 |

OTHER PUBLICATIONS

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (EUTRAN); Overall description; Stage 2 (Release 8)" Mar. 2010 (149 pages).

(Continued)

*Primary Examiner* — Brian S Roberts
(74) *Attorney, Agent, or Firm* — Osha Bergman Watanabe & Burton LLP

(57) ABSTRACT

A terminal according to the present disclosure includes: a receiving section that receives configuration information related to channel state information (CSI) reporting; and a control section that controls transmission of a plurality of pieces of wideband information each including at least one of information related to a plurality of delays and information related to a plurality of coefficients corresponding to the delays, based on the configuration information. Thereby, it is possible to prevent degradation of the reporting accuracy of CSI while suppressing the increment of the UL overhead.

4 Claims, 14 Drawing Sheets

(56) References Cited

U.S. PATENT DOCUMENTS

| | | | |
|---|---|---|---|
| 2017/0019163 A1* | 1/2017 | Yoshimoto | H04L 5/0035 |
| 2017/0141833 A1* | 5/2017 | Kim | H04L 5/0057 |
| 2018/0138950 A1* | 5/2018 | Rahman | H04B 7/0626 |
| 2018/0167116 A1* | 6/2018 | Rahman | H04B 7/0478 |
| 2019/0312615 A1* | 10/2019 | Wu | H04B 7/063 |
| 2020/0162142 A1* | 5/2020 | Rahman | H04B 7/0639 |
| 2020/0177249 A1* | 6/2020 | Ramireddy | H04B 7/0673 |
| 2021/0021314 A1* | 1/2021 | Sun | H04L 5/0051 |
| 2021/0306048 A1* | 9/2021 | Shi | H04B 7/0639 |

OTHER PUBLICATIONS

International Search Report issued in International Application No. PCT/JP2019/028496, mailed Feb. 18, 2020 (5 pages).
Written Opinion issued in International Application No. PCT/JP2019/028496; Dated Feb. 18, 2020 (4 pages).

* cited by examiner

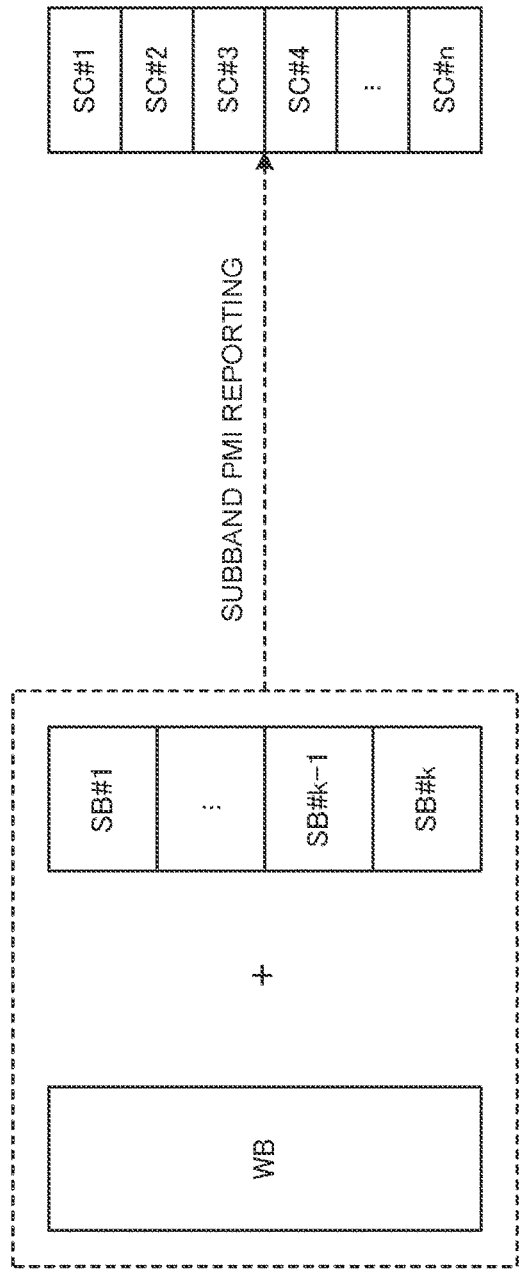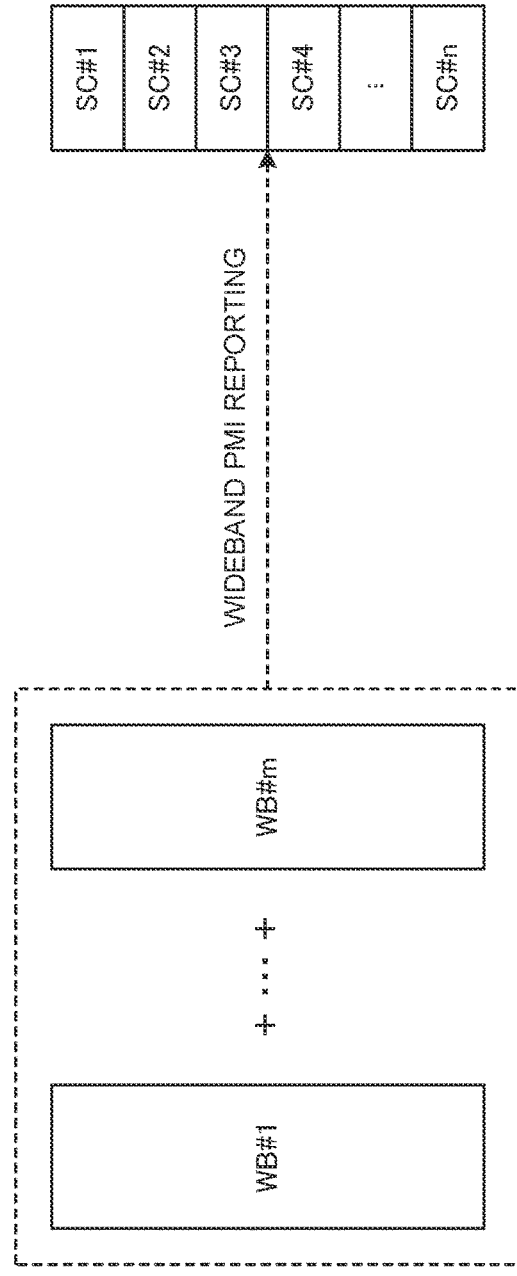

| | |
|---|---|
| SUBCARRIER #1 | $w^{(1)} = e^{-j2\pi\tau_1 f_1}g_1 + e^{-j2\pi\tau_2 f_1}g_2$ |
| SUBCARRIER #2 | $w^{(2)} = e^{-j2\pi\tau_1 f_2}g_1 + e^{-j2\pi\tau_2 f_2}g_2$ |
| SUBCARRIER #3 | $w^{(3)} = e^{-j2\pi\tau_1 f_3}g_1 + e^{-j2\pi\tau_2 f_3}g_2$ |
| ⋮ | ⋮ |
| SUBCARRIER #n | $w^{(n)} = e^{-j2\pi\tau_1 f_n}g_1 + e^{-j2\pi\tau_2 f_n}g_2$ |

| WIDEBAND INFORMATION #1 | WIDEBAND INFORMATION #2 |
|---|---|
| DI INDICATING DELAY $\tau_1$ DMI/PMI INDICATING COEFFICIENT $g_1$ | DI INDICATING DELAY $\tau_2$ DMI/PMI INDICATING COEFFICIENT $g_2$ |

FIG. 3

| WIDEBAND INFORMATION #1 | WIDEBAND INFORMATION #2 |
|---|---|
| CODEWORD $\tilde{w}_1$ FOR DELAY $\tau_1$ ANGLE $\theta_1$ COEFFICIENT $g^{(1)}$ | CODEWORD $\tilde{w}_2$ FOR DELAY $\tau_2$ ANGLE $\theta_2$ COEFFICIENT $g^{(2)}$ |

| | |
|---|---|
| $w^{(1)} = e^{-j2\pi\tau_1 f_1} g^{(1)} A(\theta_1)\tilde{w}_1 + e^{-j2\pi\tau_2 f_1} g^{(2)} A(\theta_2)\tilde{w}_2$ | SUBCARRIER #1 |
| $w^{(2)} = e^{-j2\pi\tau_1 f_2} g^{(1)} A(\theta_1)\tilde{w}_1 + e^{-j2\pi\tau_2 f_2} g^{(2)} A(\theta_2)\tilde{w}_2$ | SUBCARRIER #2 |
| ... | ... |
| $w^{(n)} = e^{-j2\pi\tau_1 f_n} g^{(1)} A(\theta_1)\tilde{w}_1 + e^{-j2\pi\tau_2 f_n} g^{(2)} A(\theta_2)\tilde{w}_2$ | SUBCARRIER #n |

FIG. 5

| | DELAY τ | COEFFICIENT g (DESCENDING ORDER OF AMPLITUDE) | DATA RATE (bps/Hz) |
|---|---|---|---|
| CHANNEL (L=6) | [1, 5, 16, 25, 36, 39] | [0.3836+0.4494i, −0.1747+0.5002i, 0.4319−0.0172i, −0.1572+0.3252i, −0.0484+0.1853i, 0.1249−0.0235i] | 0.7370 (*) |
| DELAY DOMAIN PRECODER OF Q = 1 | [1] | [1] | 0.3019 |
| DELAY DOMAIN PRECODER OF Q = 2 | [1, 5] | [1, 0.4518+0.7745i] | 0.5058 |
| DELAY DOMAIN PRECODER OF Q = 3 | [1, 5, 16] | [1, 0.4518+0.7745i, 0.4524−0.5749i] | 0.6271 |
| DELAY DOMAIN PRECODER OF Q = 4 | [1, 5, 16, 25] | [1, 0.4518+0.7745i, 0.4524−0.5749i, 0.2459+0.5596i] | 0.7061 |
| DELAY DOMAIN PRECODER OF Q = 5 | [1, 5, 16, 25, 36] | [1, 0.4518+0.7745i, 0.4524−0.5749i, 0.2459+0.5596i, 0.1854+0.2660i] | 0.7276 |
| DELAY DOMAIN PRECODER OF Q = 6 | [1, 5, 16, 25, 36, 39] | [1, 0.4518+0.7745i, 0.4524−0.5749i, 0.2459+0.5596i, 0.1854+0.2660i, 0.1069−0.1867i] | 0.7370 |

FIG. 6

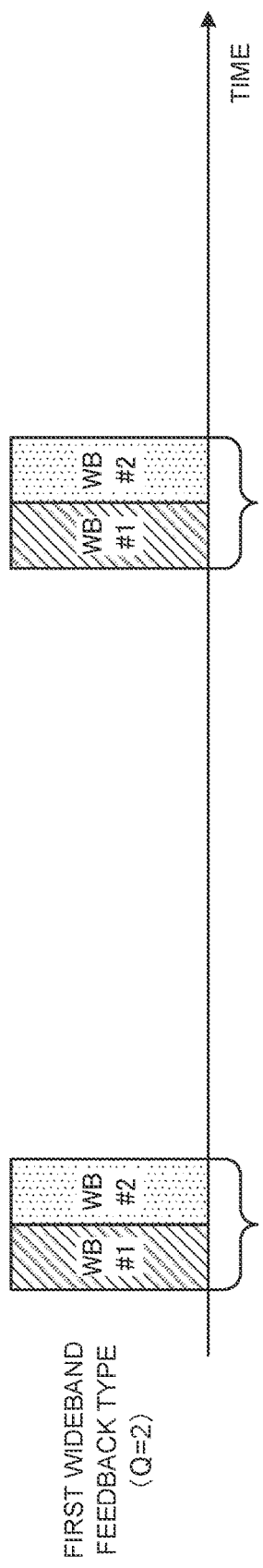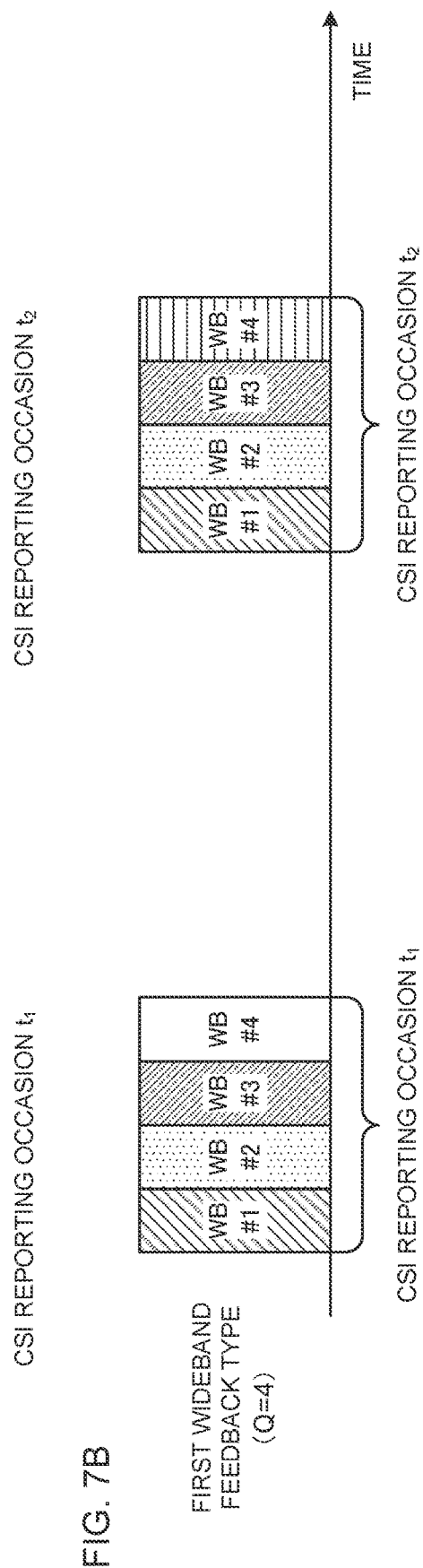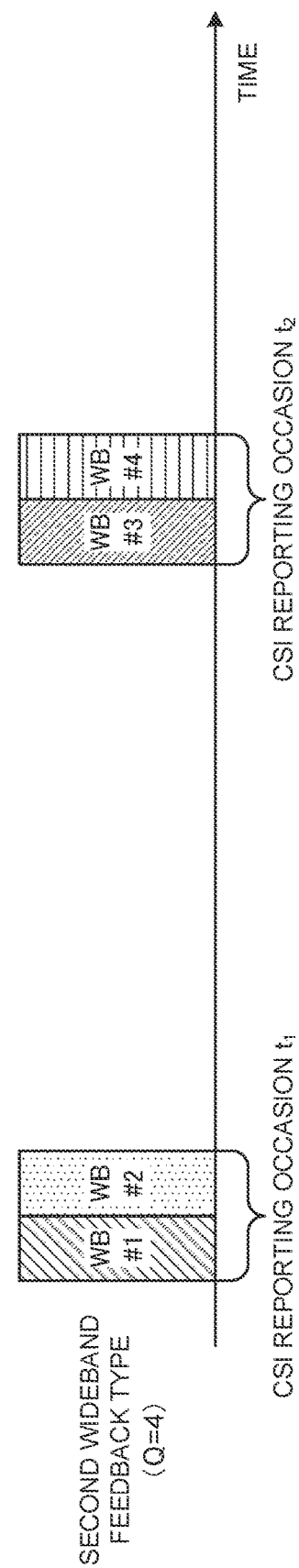

| | CSI REPORTING OCCASION $t_1$ | CSI REPORTING OCCASION $t_2$ | DATA RATE (bps/Hz) | OVERHEAD |
|---|---|---|---|---|
| FIRST WIDEBAND FEEDBACK TYPE (Q=2) | $\tau_1=[1,5]$<br>$g_1=[1, 0.4518+0.7745i]$ | $\tau_2=[1,5]$<br>$g_2=[1, 0.4518+0.7745i]$ | 0.5058 | $Oh_2$ |
| FIRST WIDEBAND FEEDBACK TYPE (Q=4) | $\tau_1=[1, 5, 16, 25]$<br>$g_1=[1, 0.4518+0.7745i, 0.4524-0.5749i, 0.2459+0.5596i]$ | $\tau_2=[1, 5, 16, 25]$<br>$g_2=[1, 0.4518+0.7745i, 0.4524-0.5749i, 0.2459+0.5596i]$ | 0.7061 | $Oh_4=2*Oh_2$ |
| SECOND WIDEBAND FEEDBACK TYPE (Q=4) | $\tau_1=[1,5]$<br>$g_1=[1, 0.4518+0.7745i]$ | $\tau_2=[16, 25]$<br>$g_2=[0.4524-0.5749i, 0.2459+0.5596i]$ | 0.7061 | $Oh_2$ |

FIG. 8

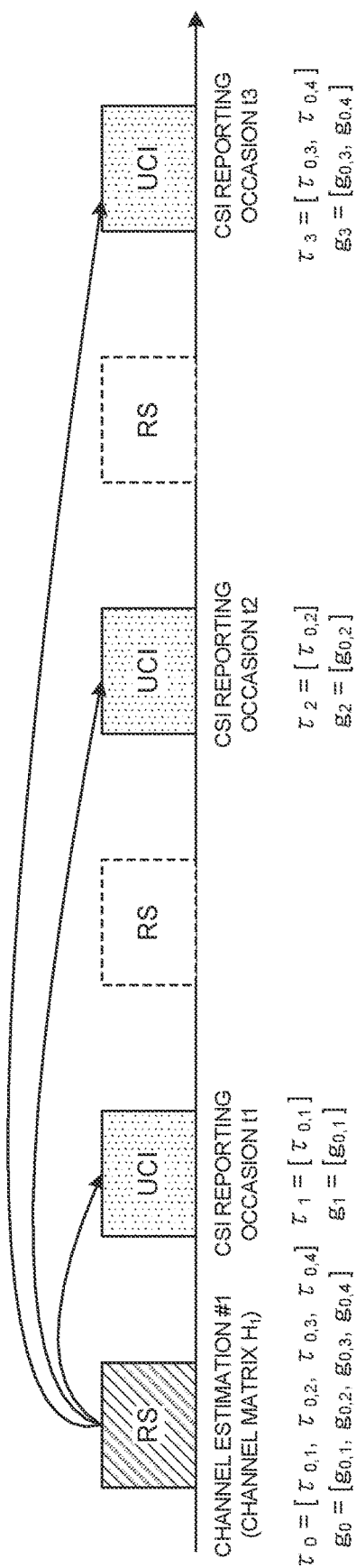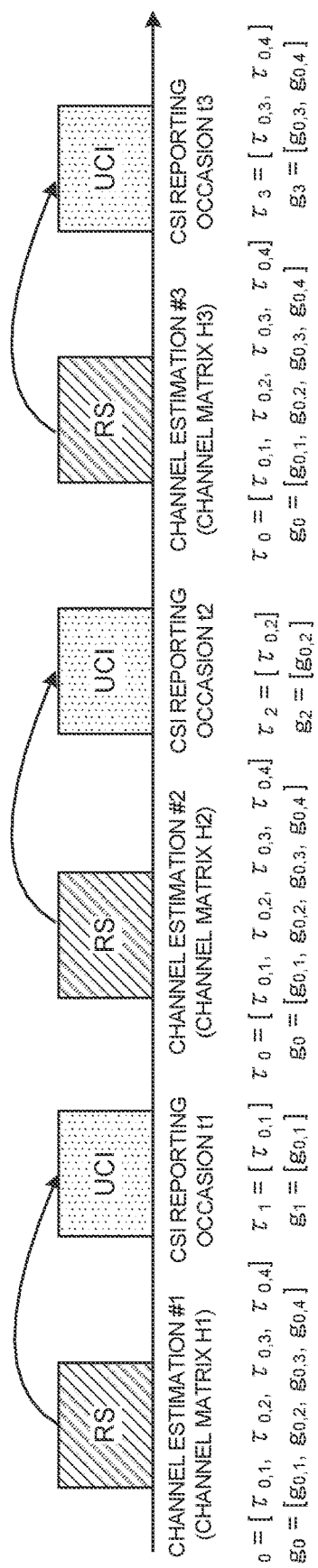

TERMINAL AND RADIO COMMUNICATION METHOD

TECHNICAL FIELD

The present disclosure relates to a terminal and a radio communication method in next-generation mobile communication systems.

BACKGROUND ART

In Universal Mobile Telecommunications System (UMTS) network, the specifications of Long-Term Evolution (LTE) have been drafted for the purpose of further increasing high speed data rates, providing lower latency and so on (see Non-Patent Literature 1). In addition, for the purpose of further high capacity, advancement and the like of the LTE (Third Generation Partnership Project (3GPP) Release (Rel.) 8 and Rel. 9), the specifications of LTE-Advanced (3GPP Rel. 10 to Rel. 14) have been drafted.

Successor systems of LTE (e.g., referred to as "5th generation mobile communication system (5G))," "5G+ (plus)," "New Radio (NR)," "3GPP Rel. 15 (or later versions)," and so on) are also under study.

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In Rel. 15 NR, wideband and subband are supported a frequency granularity of the channel state information (CSI) reporting.

Here, the wideband is the entire band targeted for reporting of CSI, and is, for example, the entire of a given carrier (also referred to as component carrier (CC), a cell, a serving cell, and the like. The subband is a part of the wideband, and is, for example, one or more physical resource blocks (PRB) (resource blocks (RBs)). The size of the subband (subband size, for example, the number of PRBs) may be determined according to the size of the wideband (wideband size, for example, the number of PRBs).

In future radio communication systems (for example, NR after Rel. 16), it is assumed that at least one of a bandwidth that is wider than Rel. 15 NR and a frequency band which is higher than Rel. 15 NR (for example, a frequency band which is higher than 52.6 GHz) becomes available.

However, in future radio communication systems, if the wideband targeted for the reporting of CSI becomes broadband, the subband size depending on the wideband size becomes greater than the coherence bandwidth, and as a result, the reporting accuracy of CSI might deteriorate. Meanwhile, in the wideband that became broadband, if the subband size is attempted to be sufficiently smaller than the coherence bandwidth, the overhead of the uplink (UL) might increase.

Thus, an object of the present disclosure is to provide a terminal and a radio communication method that can prevent degradation of the reporting accuracy of CSI while suppressing the increment of the UL overhead.

Solution to Problem

A terminal according to an aspect of the present disclosure includes: a receiving section that receives configuration information related to channel state information (CSI) reporting; and a control section that controls transmission of a plurality of pieces of wideband information each including at least one of information related to a plurality of delays and information related to a plurality of coefficients corresponding to the delays, based on the configuration information.

Advantageous Effects of Invention

According to one aspect of the present disclosure, it is possible to prevent degradation of the reporting accuracy of CSI while suppressing the increment of the UL overhead.

BRIEF DESCRIPTION OF DRAWINGS

FIGS. 2A and 2B are diagrams to show examples of feedback of wideband information according to the first aspect;

FIG. 3 is a diagram to show an example of precoder based on the wideband information according to the first aspect;

FIG. 5 is a diagram to show yet another example of precoder based on the wideband information according to the first aspect;

FIG. 6 is a diagram to show an example of delay t and coefficient g in a plurality of delay domain precoders in which the values of the total number of delays Q are different;

FIGS. 7A to 7C are diagrams to show examples of first and second wideband feedback types according to a second aspect;

FIG. 8 is a diagram to show examples of the first and second wideband feedback types according to the second aspect;

FIGS. 10A and 10B are diagrams to show other examples of incremental feedback according to the second aspect;

Figure 1:
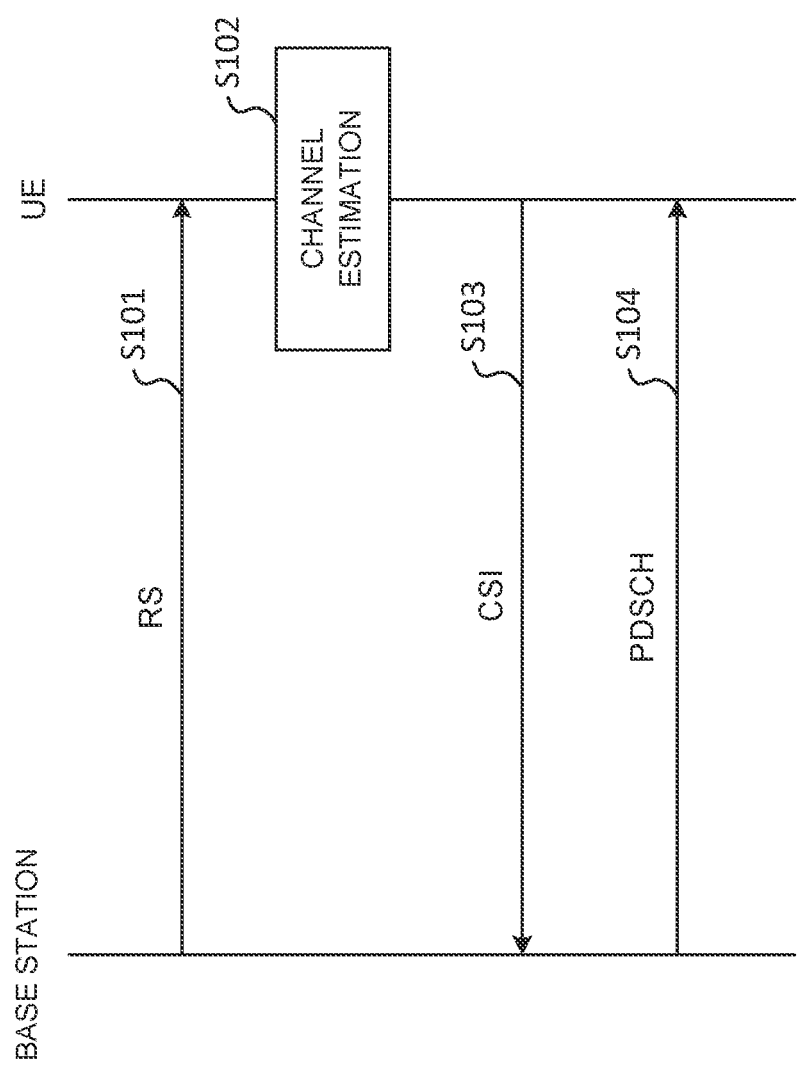
FIG. 1 is a diagram to show an example of operation of CSI reporting according to a first aspect.

DESCRIPTION OF EMBODIMENTS (CSI Report (or Reporting))

In Rel. 15 NR, a terminal (also referred to as a user terminal, User Equipment (UE), and the like) performs generation (also referred to as determination, calculation, estimation, measurement, and the like) of channel state information (CSI) based on a reference signal (RS) (or, resource for the RS), and performs transmission (also referred to as reporting, feedback, and the like) of the generated CSI to a base station. The CSI may be, for example, transmitted to the base station by using an uplink control channel (for example, Physical Uplink Control Channel (PUCCH)) or an uplink shared channel (for example, Physical Uplink Shared Channel (PUSCH)).

The RS used for the generation of CSI may be, for example, at least one of a channel state information reference signal (CSI-RS), synchronization signal/broadcast channel (Synchronization Signal/Physical Broadcast Channel (SS/PBCH)) block, synchronization signal (SS), demodulation reference signal (DMRS), and the like.

The CSI-RS may include at least one of non zero power (NZP) CSI-RS and CSI-Interference Management (CSI-IM). The SS/PBCH block is a block including an SS and PBCH (and corresponding DMRS), and may be referred to as an SS block (SSB), and the like. For example, the SS may be at least one of a primary synchronization signal (PSS) and a secondary synchronization signal (SSS).

The CSI may include at least one parameter (CSI parameter) of a channel quality indicator (CQI), precoding matrix indicator (PMI), CSI-RS resource indicator (CRI), SS/PBCH block resource indicator (SSBRI), layer indicator (LI), rank indicator (RI), L1-RSRP (Layer 1 Reference Signal Received Power), L1-RSRQ (Reference Signal Received Quality), L1-SINR (Signal to Interference plus Noise Ratio), L1-SNR (Signal to Noise Ratio), and the like.

The UE may receive information related to CSI reporting (report configuration information) and control CSI reporting based on the report configuration information. For example, the report configuration information may be "CSI-ReportConfig" of the information element (IE) of the radio resource control (RRC). Note that, in the present disclosure, the RRC IE may be expressed in other words with an RRC parameter, a higher layer parameter, and the like.

For example, the report configuration information (for example, "CSI-ReportConfig" of the RRC IE) may include at least one of the following.

Information related to the type of the CSI reporting (report type information, for example, "reportConfigType" of the RRC IE)

Information related to one or more quantities (one or more CSI parameters) of the CSI to be reported (report quantity information, for example, "reportQuantity" of the RRC IE)

Information related to the resource for the RS used for the generation of the quantities (CSI parameters) (resource information, for example, "CSI-ResourceConfigId" of the RRC IE)

Information related to the frequency domain targeted for CSI reporting (frequency domain information, for example, "reportFreqConfiguration" of the RRC IE)

For example, the report type information may indicate periodic CSI (P-CSI) reporting, aperiodic CSI (A-CSI) reporting, or semi-persistent CSI (SP-CSI) reporting.

The report quantity information may specify at least one combination of the CSI parameters described above (for example, CRI, RI, PMI, CQI, LI, L1-RSRP, and the like).

Resource information may be the ID of the resource for the RS. For example, the resource for the RS may include a CSI-RS resource or SSB of non zero power and a CSI-IM resource (for example, CSI-RS resource of zero power).

The frequency domain information may indicate frequency granularity of the CSI reporting. For example, the frequency granularity may include wideband and subband. The wideband is the entire CSI reporting band. For example, the wideband may be the entire given carrier (component carrier (CC), cell, or serving cell, or may be the entire bandwidth part (BWP) in a given carrier. The wideband may be expressed in other words with a CSI reporting band, the entire CSI reporting band, and the like.

The subband is a part in the wideband, and may be composed of one or more resource blocks (RB) (physical resource block (PRB)). The size of the subband may be determined according to the size of the BWP (the number of PRBs).

The frequency domain information may indicate which PMI of the wideband or the subband to report (for example, the frequency domain information may include "pmi-FormatIndicator" of the RRC IE used for the determination of either one of the wideband PMI reporting or the subband PMI reporting). The UE may determine the frequency granularity of the CSI reporting (in other words, either one of the wideband PMI reporting or the subband PMI reporting) based on at least one of the above-described report quantity information and the frequency domain information.

In a case where the wideband PMI reporting is configured (determined), one wideband PMI may be reported for the entire CSI reporting band. Meanwhile, in a case where the subband PMI reporting is configured, a single wideband indication is may be reported for the entire CSI reporting band, and one subband indication $i_2$ of each of one or more subbands in the entire CSI reporting (for example, subband indication of each subband) may be reported.

The UE performs a channel estimation by using an RS, and estimates a channel matrix H. The UE feeds back an index (PMI) determined based on the estimated channel matrix.

The PMI may indicate a precoder matrix (also simply referred to as a precoder) that is considered to be appropriate for the UE to use for the downlink (DL) transmission to the UE. Each value of the PMI may correspond to one precoder matrix. A set of values of the PMI may correspond to a set of different precoder matrices called precoder codebook (also simply referred to as a codebook).

In the space domain, the CSI reporting may include one or more types of CSI. For example, the CSI may include at least one of a first type (type 1CSI, type ICSI) used for selection of single beam and a second type (type 2CSI, type IICSI) used for selection of multi-beam. The single beam may be expressed in other words with a single layer, and the multi-beam may be expressed in other words with a plurality of beams. Type ICSI may not assume multi-user MIMO, and the type 2CSI may assume multi-user MIMO.

The above-described codebook may include a codebook for the type 1CSI (also referred to as a type 1 codebook, a type I codebook, and the like) and a codebook for the type 2CSI (also referred to as a Type 2 codebook, a Type II codebook, and the like). The type 1CSI may include type 1 single panel CSI and type 1 multi-panel CSI, and different codebooks (type 1 (I) single panel codebook, type 1 (I) multi-panel codebook) may be prescribed.

The frequency granularity of such CSI reporting described above depends on the overhead of the uplink (UL). For example, a particular PUCCH format (for example, PUCCH format 0 or 2 composed of one or two symbols) can support only the type 1CSI of the wideband. By increasing the size of the subband as the CSI reporting band (for example, the size of BWP) increases, the increase of the UL overhead by the reporting of CSI (for example, PMI) for each subband by the expansion of the CSI reporting band is prevented.

In NR after Rel. 16, it is assumed that a bandwidth that is wider than Rel. 15 NR becomes available. In NR after Rel. 16, it is assumed that a frequency band which is higher than Rel. 15 NR (for example, a frequency band which is higher than 52.6 GHz) becomes available. Note that the frequency band may be referred to as a frequency range (FR), and the like.

In Rel. 15 NR, because the subband size is smaller than coherence bandwidth, subband-based precoding is effective. For example, in a case where the CSI reporting band is 51 PRBs, the coherence bandwidth may be 40 PRBs, and the subband size may be four or eight PRBs.

Meanwhile, in a case where the CSI reporting band is wider than Rel. 15 NR, as a result that the subband size is greater than the coherence bandwidth, the reporting accuracy of the CSI might deteriorate. For example, in a case where the CSI reporting band is 260 PRBs, it is assumed that the coherence bandwidth is 12 PRBs, while the subband size is 16 or 32 PRBs. Meanwhile, if the ratio of the CSI reporting band and the subband size is attempted to be maintained to be the same as Rel. 15 NR (if the subband size is attempted to be sufficiently smaller than the coherence bandwidth), the UL overhead might increase.

Accordingly, a method of new CSI reporting which can prevent degradation of the reporting accuracy of CSI while preventing the increment of the UL overhead is desired.

Incidentally, in a case of using at least one of a bandwidth that is wider and a frequency band that is higher than Rel. 15 NR, it is assumed that the contribution to the sparsity of the precoder using the delay domain (delay domain precoder) is higher than a precoder using the space-frequency domain in Rel. 15 NR.

Thus, the inventors of the present invention came up with the idea of preventing degradation of the reporting accuracy of CSI while suppressing the increment of the UL overhead by feeding back information for the delay domain precoder (for example, at least one of the delay information and the coefficient information described below) as information related to the whole CSI reporting band (wideband) (wideband information).

Embodiments according to the present disclosure will be described in detail with reference to the drawings as follows.

Note that, in the present embodiment, precoder and precoding may be expressed in other words mutually. Precoding vector, precoding matrix, channel vector, and channel matrix may be expressed in other words mutually. The delay may be expressed in other words with quantity of the delay (delay quantity), and the like.

In the present embodiment, delay domain precoder is mainly described, but it is sufficient that at least delay domain is used. For example, it can also be appropriately applied to a precoder using the space-delay domain (also referred to as one-dimensional transform domain precoder, one-dimensional sparse transform domain precoder, space-delay domain precoder, and the like), and a precoder using the angular-delay domain (also referred to as two-dimensional transform domain precoder, two-dimensional sparse transform domain precoder, angular-delay domain precoder, and the like).

(First Aspect)

In the first aspect, information for the delay domain precoder fed back as wideband information will be mainly described.

<Delay Domain Precoder>

The delay domain precoder may be generated (determined) based on at least one of the following parameters.
- Coefficient(s) for Q delays (Q different delay values) g
- Delays for the coefficient(s) τ or τ for quantized delay Here, the coefficient g may be prescribed for each of the Q delays (every delay). For example, $g \in \mathbb{C}^{Q*1}$. For example, the delay τ for the coefficient g may be $\tau \in \mathbb{R}^{Q*1}$. Here, $\mathbb{R}^{Q*1}$ may be a set of Q delays τ which are not quantized. For example, τ for the quantized delay may be $\tau \in \mathbb{N}^{Q*1}$. Here, $\mathbb{R}^{Q*1}$ may be a set of Q delays τ which are not quantized. Note that the delay may be expressed in other words with a delay time, a time, and the like.

The coefficient g may be transformed into the frequency domain from the delay domain by multiplying the delay τ corresponding to the coefficient g. The coefficient of the frequency domain may be obtained (derived) by adding the coefficient transformed in the delay domain.

For example, the precoder d for N subcarriers based on the coefficient g and the delay τ may be represented by Expression 1 described below. Note that, in Expression 1, Q is the number of delays τ or coefficients g. q is a subscript of the delay τ or the coefficient g, where $0 <= q <= Q$. n is a subscript of the subcarrier, where $0 <= n <= N$.

[Math. 1]

$$d = \begin{bmatrix} \sum_{q=0}^{Q-1} g_q \\ \vdots \\ \sum_{q=0}^{Q-1} g_q e^{-j2\pi n \tau_q} \\ \vdots \\ \sum_{q=0}^{Q-1} g_q e^{-j2\pi n(N-1)\tau_q} \end{bmatrix} \in \mathbb{C}^{N \times 1} \quad \text{Expression (1)}$$

Here, the coefficient of subcarrier #n (n-th subcarrier) in delay #q (q-th delay) transformed into the frequency domain may be represented by Expression 2 described below. Power normalization may be represented by Expression 3 described below.

[Math. 2]

$$\sum_{q=0}^{Q-1} g_q e^{-j2\pi n \tau_q} \quad \text{Expression (2)}$$

$$\sqrt{N} d / \|d\| \quad \text{Expression (3)}$$

For example, the precoder $d_{Q,n}$ of subcarrier #n ($0 <= n <= N$) may be represented by the following Expressions 4, 5, and 6 in a case where the number of delays Q is 1, 2, and 3, respectively.

[Math. 3]

$$\text{if } Q = 1, d_{1,n} = g_0 \cdot e^{-j2\pi n \tau_0} \quad \text{Expression (4)}$$

$$\text{if } Q = 2, d_{2,n} = d_{1,n} + g_1 \cdot e^{-j2\pi n \tau_1} \quad \text{Expression (5)}$$

$$\text{if } Q = 3, d_{3,n} = d_{2,n} + g_2 \cdot e^{-j2\pi n \tau_2} \quad \text{Expression (6)}$$

For example, in Expression 4, because the number of delays Q=1, the precoder $d_{1,n}$ of subcarrier #n in delay #0 may be derived by the multiplication result $g_0 * e^{-j2\pi n \tau_0}$ of the coefficient $g_0$ for delay #0 (q=0) and the delay $\tau_0$ for coefficient #0.

In Expression 5, because the number of delays Q=1, the precoder $d_{2,n}$ of subcarrier #n in delay #0 and #1 may be derived by the addition result of the precoder $d_{1,n}$ of subcarrier #n in delay #0 and the multiplication result $g_1 * e^{-j2\pi n \tau_1}$ of the coefficient $g_1$ for delay #1 (q=1) and the delay $\tau_1$ for coefficient #1.

In Expression 6, because the number of delays Q=3, the precoder $d_{3,n}$ of subcarrier #n in delay #0 to #2 may be derived by the addition result of the precoder $d_{2,n}$ of subcarrier #n in delay #0 and #1 and the multiplication result $g_2 * e^{-2\pi n \tau_2}$ of the coefficient $g_2$ for delay #2 (q=2) and the delay $\tau_2$ for coefficient #2.

In this way, the coefficient g for the delay domain precoder may be transformed into the frequency domain from the delay domain by multiplying the coefficient g by the corresponding delay τ. The coefficient d of the frequency domain may be obtained by adding a transformed coefficient.

<CSI Reporting>

The UE may feed back one or more pieces of information (one or more pieces of wideband information) about the entire CSI reporting band (wideband) to the base station. Particularly, the UE may estimate a channel in a given domain and determine the wideband information based on the estimated channel (channel matrix).

For example, the UE may estimate the channel in the space-frequency domain, and transform the estimated channel matrix into the transform domain. Alternatively, the UE may estimate the channel in the transform domain.

Here, for example, the transform domain may be a domain for a precoding scheme that is different from at least one of the time domain, the frequency domain, and the space domain. For example, the transform domain may be any of the following or a combined domain of at least two of them.

Delay domain
Delay-angular domain
Delay-space domain
Sparse domain
Domain transformed or obtained from the frequency domain
Domain associated with the frequency domain
Domain related to at least one of delay and angle
Domain having sparsity «Channel Estimation in Space-Frequency Domain»

In a case of performing channel estimation in the space-frequency domain, the UE may transform the estimated channel (channel matrix) into the transform domain, and feed back the information (channel information) about the transformed channel (channel matrix) to the base station as the above-described wideband information.

Alternatively, the UE may calculate a precoder in the transform domain based on the estimated channel (channel matrix) in the space-frequency domain, and feed back the information (precoder information) about the transform precoder to the base station as the above-described wideband information.

«Channel Estimation in Transform Domain»

In a case of performing channel estimation in the transform domain, the UE may feed back the information (channel information) about the estimated channel (channel matrix) to the base station.

Alternatively, the UE may calculate a precoder in the transform domain based on the estimated channel (channel matrix) in the transform domain, and feed back the information (precoder information) about the transform precoder to the base station as the above-described wideband information.

«Determination of Precoder (Channel) Vector»

By multiplying one or more pieces of wideband information (for example, the above-described channel information or precoder information), the base station may obtain (determine) a precoder vector (or channel vector) in each subcarrier, each PRB, or a plurality of PRBs.

FIG. 1 is a diagram to show an example of operation of CSI reporting according to the first aspect. As shown in FIG. 1, in step S101, the base station transmits the above-described RS. In step S102, the UE estimate a channel in a given domain (for example, the space-frequency domain or the transform domain) based on the RS from the base station.

The UE determines the precoder information related to the precoder determined based on the channel information related to the estimated channel (channel matrix) or the estimated channel (channel matrix). Note that in a case where the channel estimation is performed in the space-frequency domain as described above, the channel information or the precoder information may be determined after changing the channel (channel top row) estimated in the space-frequency domain into the transform domain.

In step S103, the UE transmits one or more pieces of wideband information (for example, one or more pieces of channel information or one or more pieces of precoder information). FIGS. 2A and 2B are diagrams to show examples of feedback of wideband information according to the first aspect.

For example, as shown in FIG. 2A, the UE may feed back one piece of wideband information and information related to subband #1 to #k (k>1) to the base station (which may be referred to as subband PMI reporting, and the like).

As shown in FIG. 2B, the UE may feed back a plurality of pieces of wideband information #1 to #m (1<m«k) to the base station (which may be referred to as wideband PMI reporting, and the like).

In step S104 of FIG. 1, the base station may determine precoding vector (or channel vector) for each subcarrier based on the feedback information from the UE in step S103. The UE may transmit a downlink shared channel (for example, Physical downlink Shared Channel) in the frequency domain and the space domain based on the precoding vector (or channel vector).

In this way, in the present embodiment, based on the report configuration information (for example, "CSI-ReportConfig" of RRC IE), a single piece of wideband information and information related to each subband (for example, FIG. 2A) may be reported, or a plurality of pieces of wideband information (for example, FIG. 2B) may be reported. The UE may determine whether to feed back a single piece or a plurality of pieces of wideband information based on at least one of the above-described report quantity information (for example, "reportQuantity" of the RRC IE) and the frequency domain information (for example, "pmi-FormatIndicator" of the RRC IE).

<Definition of Delay Domain Precoder>

«First Definition»

In the first definition, a delay domain precoder may be introduced in substitution for a subband-based precoder.

Particularly, in a given frequency range (FR), a subband-based precoder may not be supported, and a delay domain precoder may be supported.

For example, the FR which does not support the subband-based precoder but supports the delay domain precoder may be at least one of 7.125 GHz to 24.25 GHz (also referred to as FR3, and the like) and 52.6 GHz to 114.25 GHz (also referred to as FR4, and the like). Note that the FR may be expressed in other words with a frequency band, band, and the like.

The UE may receive the configuration information related to the delay domain precoder (delay domain precoder configuration information). The delay domain precoder configuration information may be supported in substitution for the configuration information related to the subband-based precoder (subband-based precoder configuration information, for example, parameter about the subband in "reportFreqConfiguration" of the RRC IE).

«Second Definition»

In the second definition, the delay domain precoder may be introduced in addition to the subband-based precoder. Particularly, in a given FR, the subband-based precoder and the delay domain precoder may be supported.

For example, the FR supporting both of the subband-based precoder and the delay domain precoder may be at least one of 410 MHz to 7.125 GHz (also referred to as FR1, and the like) and 24.25 GHz to 52.6 GHz (also referred to as FR2, and the like).

The UE may receive information indicating which of the subband-based precoder or the delay domain precoder to apply (application information, for example, "pmi-Format-Indicator" of the RRC IE). The UE may receive at least one of the above-described delay domain precoder configuration information and the subband-based precoder configuration information.

<CSI Parameter for Delay Domain Precoder>

In Rel. 15 NR, each CSI parameter may be calculated based on a given rule. The given rule may be based on the dependency between CSI parameters. For example, the above-described LI may be calculated based on reported CQI, PMI, RI and CRI. The above-described CQI may be calculated based on reported PMI, RI and CRI. The PMI may be calculated based on reported RI and CRI. The RI may be calculated based on reported CRI.

In the first aspect, the CSI may include a parameter for the delay precoder. For example, the parameter for the delay precoder may include at least one of the following.

Information (coefficient information) about the coefficient g (for example, $g \in C^{Q*1}$) for Q delays (Q different delay values)

Information related to delays for the coefficient (s) T (for example, $\tau \in R^{Q*1}$) or information related to quantized delay t (for example, $t \in N^{Q*1}$), note that, in the following, the information related to delays $\tau$ for the coefficient(s) g and the information related to quantized delay $\tau$ are collectively referred to as delay information.

Here, the total number of delays Q may be reported by at least one of higher layer signaling (for example, RRC signaling) and physical layer signaling to the UE. For example, the above-described delay domain precoder configuration information may include information indicating the total number of delays Q.

«Delay Information»

For example, the delay information may be information indicating each delay $\tau$ (also referred to as delay indicator (DI), and the like). The value of q-th delay $\tau_q$ may be non-quantized or may be quantized.

In a case of being non-quantized, for example, $\tau_q$ may be $\tau_q \in R$ and $\tau_q \geq 0$. Here, R may be a set of Q delays $\tau$ which are not quantized.

Meanwhile, in a case of being quantized, for example, $\tau_q$ may be $\tau_q = m*T_{DP}$. Here, $m \in N$. N may be a set of quantized Q delays $\tau$. The TDP may be a unit of quantization. For example, the TDP may be reciprocal of the bandwidth, in other words, 1/bandwidth. Note that the bandwidth may be the number of resource blocks that constitute the bandwidth. Because the bandwidth in the wideband system is greater than the subband, granularity can be increased compared to using $T_{DP}$.

The DI fed back as CSI may indicate an offset between the delay $\tau_q$ and an adjacent delay $\tau_{q+1}$ (or $\tau_{q-1}$), may indicate a gap between the delay $\tau$ and the first delay $\tau_1$, or may indicate quantity of the delay $\tau_q$ itself. Note that the offset may be expressed in other words with a gap, an offset quantity, a difference, and the like.

For example, in a case where DI indicates an offset between the delay $\tau_q$ and an adjacent delay $\tau_{q+1}$ (or $\tau_{q-1}$), the offset $\Delta\tau$ may be represented by the following Expression 7.

$$\Delta\tau = [\Delta\tau_1, \ldots, \Delta\tau_{Q-1}], \text{ where} \quad \text{(Expression 7)}$$

$$\Delta\tau_q = \tau_{q+1} - \tau_q \text{ (for example, } 1 <= q <= Q-1)$$

In a case where DI indicates an offset between the delay $\tau_q$ and the first delay $\tau_1$, the offset $\Delta\tau$ may be represented by the following Expression 8.

$$\Delta\tau = [\Delta\tau_1, \ldots, \Delta\tau_{Q-1}], \text{ where} \quad \text{(Expression 8)}$$

$$\Delta\tau_q = \tau_{q+1} - \tau_1 \text{ (for example, in the case of } 1 <= q <= Q)$$

In a case where DI indicates quantity of the delay $\tau_q$ itself, the delay $\tau$ may be represented by the following Expression 9.

$$\tau = [\tau_1, \ldots, \tau_Q] \quad \text{(Expression 9)}$$

(for example, in the case of $1 <= q <= Q$)

Note that the above Expressions 7 to 9 are merely examples, and it is not limited to the above. For example, in Expressions 7 to 9, the range that the subscript q of the delay $\tau$ can take may be $0<=q<=Q-2$ (or Q-1). Expression 7 may be $\Delta\tau_q = \tau_q - \tau_{q-1}$, where $\tau_{q-1}=0$. Expression 8 may be $\Delta\tau_q = \tau_q - \tau_0$ (for example, in the case of $0<=q<=Q-1$).

«Coefficient Information»

For example, the coefficient information may be information indicating the matrix for the delay precoding (delay precoding matrix indicator (DMI)) or may reuse an existing precoding matrix indicator (PMI).

For example, the DMI may explicitly or implicitly indicate the delay domain precoder. The DMI is prescribed separately from the existing PMI. Accordingly, the UE can report CSI including the DMI in a base station without making modifications to the existing PMI.

Meanwhile, the PMI in Rel. 15 NR may explicitly or implicitly indicate the delay domain precoder. In this case, existing signaling for the PMI can be reused.

The above-described DMI or PMI (DMI/PMI) may be information explicitly indicating the coefficient g, or may be information indicating the coefficient g on the basis of the codebook.

The above-described DMI/PMI may (1) indicate the amplitude and phase of the quantized coefficient g, (2) may indicate the coefficient g quantized based on a modulation order (or modulation scheme), or (3) may indicate the coefficient g which is not quantized.

Alternatively, (4) one or more codebooks (for example, a plurality of codebooks having different sizes) may be prescribed. In this case, the above-described DMI/PMI may indicate a coefficient g selected from a corresponding codebook.

For example, suppose that the coefficient g is represented by the following Expression 10.

[Math. 4]

$$g = \begin{bmatrix} -0.7445 \\ -0.3364 - 0.5766i \end{bmatrix} \qquad \text{Expression (10)}$$

(1) Amplitude and Phase of Quantized Coefficient g

The amplitude of the above-described coefficient g may be quantized based on a given number (for example, the number of bits) n. The quantization set may be prescribed as "0:1/(2^n−1):1". "0:1/(2^n−1):1" may indicate a set including a plurality of fractions that increment a numerator of 1/(2^n−1) by 1 at 0 and 1 and between 0 and 1. For example, in the case of n=2, the quantization set may be {0, ⅓, ⅔, 1}. In the case of n=3, the quantization set may be {0, 1/7, 2/7, 3/7, 4/7, 5/7, 6/7, 1}.

The UE may select a value (closest value) that is closest to the amplitude of the above-described coefficient g from the above-described quantization set. For example, in the above-described case of n=3, the amplitude before and after the quantization may be represented as follows.

[Math. 5]

$$\text{BEFORE QUANTIZATION:} \begin{bmatrix} 0.7445 \\ 0.6676 \end{bmatrix} \quad \text{AFTER QUANTIZATION:} \begin{bmatrix} 6/8 \\ 5/8 \end{bmatrix}$$

The phase of the above-described coefficient g may be quantized based on a given number (for example, the number of bits) m. The quantization set may be prescribed by {−π, −π+½^m*2*π, . . . , −π+(2^m−1)/2^m*2*π}. For example, in the case of m=2, the quantization set may be {−π, −π/2, 0, π/2}.

The UE may select a value (closest value) that is closest to the phase of the above-described coefficient g from the above-described quantization set. For example, in the above-described case of m=2, the phase before and after the quantization may be represented as follows.

[Math. 6]

$$\text{BEFORE QUANTIZATION:} \begin{bmatrix} \pi \\ -2/3\pi \end{bmatrix} \quad \text{AFTER QUANTIZATION:} \begin{bmatrix} -\pi \\ -1/2\pi \end{bmatrix}$$

Note that it is sufficient that π is a particular value, and, for example, −π may be quantized in substitution for −½π.
(2) Coefficient g Quantized Based on Modulation Order The quantization set by the modulation order may be constellation having 2 to the n-th power values normalized by the maximal amplitude on the constellation. Here, n may be a given number (for example, each modulation order).

For example, in the case of n=2, it is Quadrature Phase Shift Keying (QPSK), and the quantization set may be {0.7071+0.7071i, 0.7071−0.7071i, −0.7071+0.7071i, −0.7071−0.7071i}.

In the case of n=3, it is 16 quadrature amplitude modulation (QAM) (for example, QAM normalized by √1.8), and the quantization set may be {0.2357+0.2357i, 0.2357+0.7071i, 0.7071+0.2357i, 0.7071+0.7071i, 0.2357−0.2357i, 0.2357−0.7071i, 0.7071−0.2357i, 0.7071−0.7071i, −0.2357+0.2357i, −0.2357+0.7071i, −0.7071+0.2357i, −0.7071+0.7071i, −0.2357−0.2357i, −0.2357−0.7071i, −0.7071−0.2357i, −0.7071−0.7071i}.

The UE may select a value that is closest to the above-described coefficient g from the above-described quantization set. For example, in the above-described case of n=4, the coefficient g before and after the quantization may be represented as follows.

[Math. 7]

$$\text{BEFORE QUANTIZATION:} \begin{bmatrix} -0.7445 \\ -0.3364 - 0.5766i \end{bmatrix}$$

$$\text{AFTER QUANTIZATION:} \begin{bmatrix} -0.7071 + 0.2357i \\ -0.2357 - 0.7071i \end{bmatrix}$$

Alternatively, codebooks having different sizes may be prescribed. In this case, the above-described DMI/PMI may indicate a coefficient g selected from a corresponding codebook.

Note that the above-described QAM may include not only 16QAM, but also 64QAM, 256QAM, and the like.

(4) Codebook

One or more codebooks (for example, a plurality of codebooks having different sizes) may be prescribed. For the codebook, a discrete Fourier transform (DFT) matrix of a certain size (for example, size of 2 to the n-th power*2 to the n-th power) may be used. Here, n may be a given number (for example, the number of feedback bits).

For example, in the case of n=1, one or more 2*1 matrices may be prescribed for the codebook (also referred to as DFT codebooks, and the like). For example, the codebook may be represented in the following.

[Math. 8]

$$[1\ 1; 1\ -1] * 1/\sqrt{2}$$

The UE may select a vector having the closest distance to the above-described coefficient g in the above-described codebook. For example, in the above-described case of n=1, the vector selected from the above-described codebook for the above-described coefficient g (see above Expression 10) may be represented as follows. The coefficient g before and after the quantization may be represented as follows.

[Math. 9]

$$\begin{bmatrix} 1 \\ -1 \end{bmatrix} * 1/\sqrt{2}$$

<Precoder Generation in Frequency Domain>

As described above, in Rel. 15 NR, in a case where the subband PMI reporting is configured for the UE, the UE feeds back the wideband PMI and the subband PMI for each subband to the base station. The base station may determine a matrix $W_1$ based on the wideband PMI and determine a matrix $W_2$ for each subband based on the subband PMI for each subband.

The UE may determine a precoder matrix W to use for the precoding of downlink transmission (for example, PDSCH) based on the matrices W1 and W2. For example, the precoder matrix may be calculated by Expression 11 described below.

$$W = W_1 W_2 \quad \text{(Expression 11)}$$

Meanwhile, in a case where the UE feeds back each wideband information (for example, at least one of coefficient information and delay information), it is a problem how to prescribe a precoder d.

In the first aspect, the precoder d (which may be obtained from the codebook g) in the frequency domain may be determined based on the coefficient g determined based on the coefficient information (for example, DMI/PMI) and the delay $\tau$ determined based on the delay information (for example, DI). For example, the precoder d may be determined by using the following Expression 12.

[Math. 10]

$$d = f(g, \tau) = \left[ \sum_{q=0}^{Q-1} g_q, \ldots, \sum_{q=0}^{Q-1} g_q e^{-j2\pi n \tau_q}, \ldots, \sum_{q=0}^{Q-1} g_q e^{-j2\pi n(N-1)\tau_q} \right]^T \in \mathbb{C}^{N \times 1} \quad \text{Expression (12)}$$

Here, Q is the total number of delays, and q is a subscript of the delay. N is the total number of subcarriers, and n is a subscript (index) of the subcarrier.

FIG. 3 is a diagram to show an example of precoder based on the wideband information according to the first aspect. For example, in FIG. 3, 1 dimension (1D)-sparse transform domain precoder (space-delay domain precoder) may be used.

In FIG. 3, as described in FIG. 2B, suppose that m (m>1, here m=2) pieces of wideband information are reported from the UE. Each wideband information may include at least one of the delay information (for example, the above-described DI) and the coefficient information (for example, the above-described DMI/PMI).

For example, in FIG. 3, the total number of delays Q is Q=2, and the wideband information #1 and #2 is reported from the UE to the base station. The wideband information #1 may include a DI indicating a delay $\tau_1$ and a DMI/PMI indicating a coefficient $g_1$ for the delay $\tau_1$. The wideband information #2 may include a DI indicating a delay $\tau_2$ and a DMI/PMI indicating a coefficient $g_2$ for the delay $\tau_2$. Note that the lengths (sizes) of $g_1$ and $g_2$ may relate to the number of antennas.

As shown in FIG. 3, a precoder $W^{(i)}$ of subcarrier #i ($1 \leq i \leq n$) in a case of Q=2 may be determined based on at least one of the DI and the DMI/PMI included in each of m pieces of wideband information.

For example, in FIG. 3, the precoder $W^{(i)}$ is determined based on the delay $\tau_1$ indicated by the DI and the coefficient $g_1$ indicated by the DMI/PMI in wideband information #1 and the delay $\tau_2$ indicated by the DI and the coefficient $g_2$ indicated by the DMI/PMI in wideband information #2.

Note that, in FIG. 3, index #i of a subcarrier is $1 \leq i \leq n$, but i is not limited to this, and i may be $0 \leq i \leq n-1$.

Figure 4:
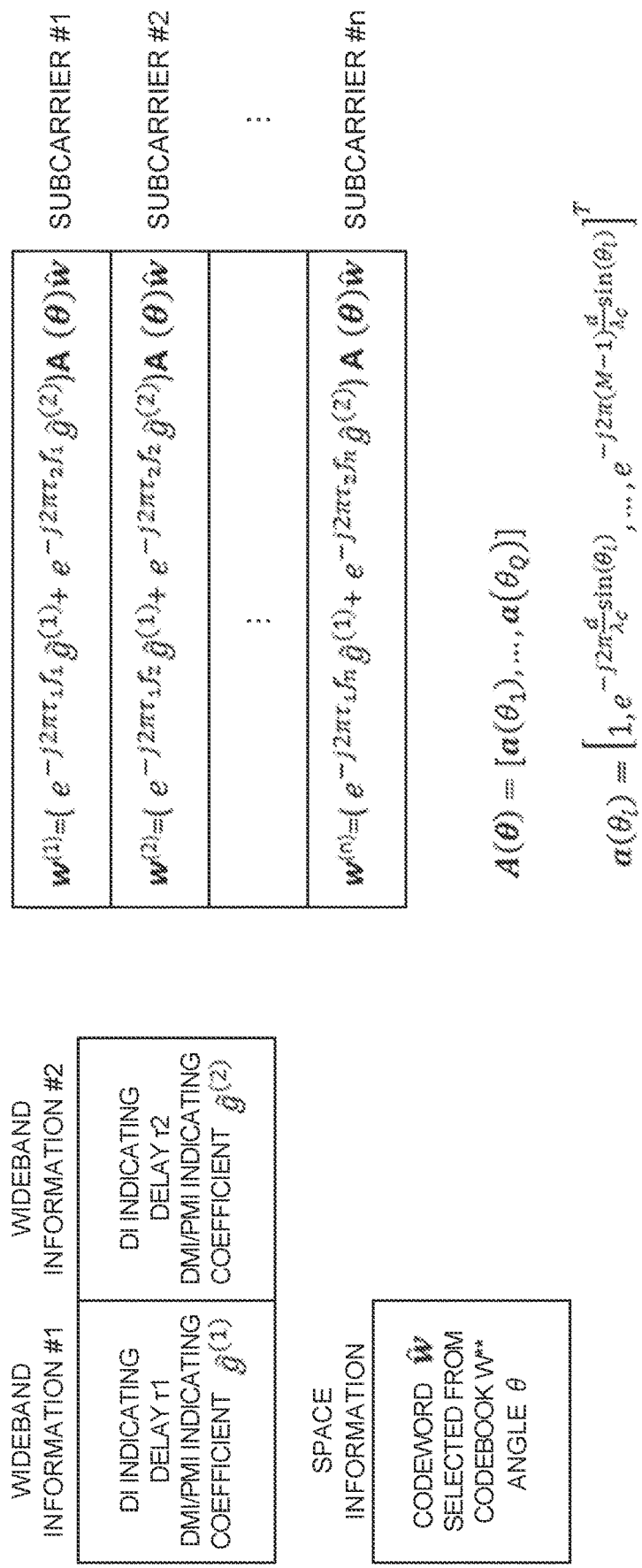
FIG. 4 is a diagram to show another example of precoder based on the wideband information according to the first aspect.

FIG. 4 is a diagram to show another example of precoder based on the wideband information according to the first aspect. For example, in FIG. 4, 2 dimension (2D)-sparse transform domain precoder (angular-delay domain precoder) may be used. In FIG. 4, a precoder of the angular domain and the delay domain may be jointed.

In FIG. 4, suppose that information related to the space (spatial information) is reported from the UE in addition to the m (m>1, here m=2) pieces of wideband information. Each wideband information may include at least one of the delay information (for example, the above-described DI) and the coefficient information (for example, the above-described DMI/PMI).

The spatial information may include information related to at least one of a codeword CW and an angle $\theta$ selected from a codebook W. Note that the size of the codebook W may relate to channel correlation.

As shown in FIG. 4, a precoder $W^{(i)}$ of subcarrier #i ($1 \leq i \leq n$) in a case of Q=2 may be determined based on at least one of the DI and the DMI/PMI included in each of m pieces of wideband information and the angle $\theta$ and the codeword determined by the spatial information.

For example, in FIG. 4, the precoder $W^{(i)}$ is determined based on the delay $\tau_1$ indicated by the DI and the coefficient $g_1$ indicated by the DMI/PMI in wideband information #1, the delay $\tau_2$ indicated by the DI and the coefficient $g_2$ indicated by the DMI/PMI in wideband information #2, and the angle $\theta$ and the codeword determined by the spatial information. Note that, in FIG. 4, index i of a subcarrier is $1 \leq i \leq n$, but i is not limited to this, and i may be $0 \leq i \leq n-1$.

Here, A ($\theta$) used for the determination of the precoder $W^{(i)}$ of subcarrier #i ($1 \leq i \leq n$) of FIG. 4 may be prescribed by the following Expression 13 and Expression 14.

[Math. 11]

$$A(\theta) = [a(\theta_1), \ldots, a(\theta_Q)] \quad \text{Expression (13)}$$

$$a(\theta_l) = \left[ 1, e^{-j2\pi \frac{d}{\lambda_C} \sin(\theta_l)}, \ldots, e^{-j2\pi(M-1)\frac{d}{\lambda_C}\sin(\theta_l)} \right]^T \quad \text{Expression (14)}$$

Here, M is the number of antennas. The Q is the lengths of vectors $g_m$ and $\theta_m$. $g_{ml}$ and $\theta_{ml}$ are l-th ($1 \leq l \leq Q$) elements of the vectors $g_m$ and $\theta_m$, respectively. d is the antenna space. $\lambda_c$ is the wavelength.

FIG. 5 is a diagram to show yet another example of precoder based on the wideband information according to the first aspect. FIG. 5 may be different from FIG. 4 in that precoders of the angle domain and the delay domain are separate. FIG. 5 may be different from FIG. 4 in that the codeword and the angle $\theta$ are not common between delays $\tau_q$, and the codeword and the angle θ are reported for each delay $\tau_q$ (in other words, for each piece of wideband information). In the following, differences from FIG. 4 will be mainly described.

In FIG. 5, suppose that m (m>1, here m=2) pieces of wideband information are reported from the UE. Each wideband information may include at least one of the information related to the codeword for the delay τ (codeword information) and the information related to the angle θ (angle information), in addition to the delay information (for example, the above-described DI) and the coefficient information (for example, the above-described DMI/PMI).

As shown in FIG. 5, a precoder $W^{(i)}$ of subcarrier #i (1<=i<=n) in a case of Q=2 may be determined based on at least one of the DI and the DMI/PMI included in each of m pieces of wideband information and the angle θ determined based on the angle information and the codeword determined based on the codeword information.

For example, in FIG. 5, the precoder $W^{(i)}$ is determined based on the delay $\tau_1$ indicated by the DI, the coefficient $g_1$ indicated by the DMI/PMI, and the angle $\theta_1$ and the codeword in wideband information #1, and the delay $\tau_2$ indicated by the DI, the coefficient $g_2$ indicated by the DMI/PMI, and the angle $\theta_2$ and the codeword in wideband information #2.

Note that A ($\theta_1$) and A ($\theta_2$) of FIG. 5 may be prescribed similarly to the above-described Expression 12 and Expression 13, respectively. In FIG. 5, index i of a subcarrier is 1<=i<=n, but i is not limited to this, and i may be 0<=i<=n−1.

As described above, in the first aspect, the UE feeds back each piece of wideband information including at least one of delay information and coefficient information. The base station determines a precoder for each subcarrier based on each piece of wideband information. Thereby, even if a wideband to be targeted for reporting of CSI is becomes broadband, it is possible to prevent degradation of the reporting accuracy of CSI while reducing the UL overhead.

(Second Aspect)

In the second aspect, feedback of a plurality of pieces of wideband information corresponding to a plurality of delays will be described. The plurality of pieces of wideband information may be transmitted at the same CSI reporting occasion, or may be transmitted while dispersed to a plurality of CSI reporting occasions.

Feedback (reporting) of the plurality of pieces of wideband information at the same CSI reporting occasion may be referred to as "the first wideband PMI feedback (reporting)," "the first feedback (reporting)," "the first type," "the first feedback (reporting) type" "the first wideband feedback (reporting) type," and the like.

Note that, the CSI reporting occasion may be expressed in other words with a feedback instance, a CSI reporting, a reporting occasion, a reporting instance, a reporting timing, and the like. The plurality of pieces of wideband information may be included in the same uplink control information (UCI) (same PUCCH or PUSCH).

FIG. 6 is a diagram to show an example of delay τ and coefficient g in a plurality of delay domain precoders in which the values of the total number of delays Q are different. For example, in FIG. 6, a case in which the number of paths of the channel L is L=6 is assumed, but the present invention is not limited to this. In FIG. 6, each value of delay τ may be each value of a normalized delay. Each value of the coefficient g may be each value before power normalization.

As shown in FIG. 6, a set of values of the delay $\tau_1$ and the coefficient $g_1$ of the delay domain precoder for $Q_1$ delays is contained in a set of values of the delay $\tau_2$ and the coefficient $g_2$ of the delay domain precoder for $Q_2$ delays (Q2>Q1). Accordingly, the delay domain precoder can be said to be self-contained.

With a self-contained delay domain precoder, when the total number of delays Q to be reported increases, a gain on the data rate can be obtained. For example, in FIG. 6, in the case of Q=4, a gain of 40% of data rate for Q=2 can be obtained.

Meanwhile, when the total number of delays Q increases, the number of pieces of wideband information to feed back in one CSI reporting occasion also increases. Thus, a plurality of pieces of wideband information corresponding to a plurality of delays may be fed back dispersedly at a plurality of different CSI reporting occasions.

Feedback of the wideband information having the number of pieces that is equal to the total number of delays Q while dispersed at a plurality of CSI reporting occasions may be referred to as "incremental feedback," "the second wideband PMI feedback (reporting)," "the second feedback (reporting)," "the second type," "the second feedback (reporting) type," "the second wideband feedback (reporting) type," and the like.

FIGS. 7A to 7C and 8 are diagrams to show examples of the first and second wideband feedback types according to the second aspect. In FIGS. 7A and 7B, an example of the first wideband feedback type in a case of the total number of delays Q=2 or 4 is shown. In FIG. 7C, an example of the second wideband feedback type (incremental feedback) in a case of the total number of delays Q=4 is shown. In FIG. 8, an example of values of a plurality of pieces of wideband information that are reported at the CSI reporting occasions $t_1$ and $t_2$ of FIGS. 7A to 7C is shown.

As shown in FIGS. 7A and 7B, in the first wideband feedback type, wideband information #1 to #4 having the number of pieces that is equal to the total number of delays Q (Q=2 and 4 in FIGS. 7A and 7B, respectively) may be fed back at each of the CSI reporting occasions $t_1$ and $t_2$. Note that the CSI reporting occasion may be configured in a certain cycle for the UE.

As shown in FIG. 8, in the first wideband feedback type (Q=2), the wideband information #1 that is reported at the CSI reporting occasions $t_1$ and $t_2$ includes the delay information (for example, "1" in $\tau_1$ and $\tau_2$ of FIG. 8) and the coefficient information (for example, "1" in $g_1$ and $g_2$ of FIG. 8) about the delay "1". Meanwhile, the wideband information #2 that is reported at the CSI reporting occasions $t_1$ and $t_2$ may include the delay information (for example, DI indicating "5" in $\tau_1$ and $\tau_2$ of FIG. 8) and the coefficient information (for example, DMI/PMI indicating "0.4518+0.7745i" in $g_1$ and $g_2$ of FIG. 8) about the delay "5".

Similarly, in the first wideband feedback type (Q=4), each of the wideband information #1 to #4 that is reported at the CSI reporting occasions $t_1$ and $t_2$ may include the delay information related to the values corresponding to $\tau_1$ and $\tau_2$ of FIG. 8 (for example, DI indicating 1, 5, 16 or 25), and the coefficient information related to the values corresponding to $g_1$ and $g_2$ of FIG. 8 (for example, DMI/PMI indicating 1, 0.4518+0.7745i, 0.4524−0.5749i, or 0.2459+0.5596i).

Meanwhile, as shown in FIG. 7C, in the second wideband feedback type (Q=4), the wideband information #1 to #4 having the number of pieces that is equal to the total number of delays Q (Q=4 in FIG. 7C) may be fed back while dispersed to the CSI reporting occasions $t_1$ and $t_2$. For example, in FIG. 7C, the wideband information #1 and #2 is fed back at the CSI reporting occasion $t_1$, and the wideband information #3 and #4 is fed back at the CSI reporting occasion $t_2$.

Note that, the number of pieces of wideband information fed back at one CSI reporting occasion may be determined based on the total number of the delays Q and the number of CSI reporting occasions T used for the reporting of the Q pieces of wideband information. For example, the number of pieces of wideband information fed back in one CSI reporting occasion is 2 because Q=4 and T=2 in FIG. 7C.

As shown in FIG. 8, in the second wideband feedback type (Q=4), each of the wideband information #1 and #2 that is reported at the CSI reporting occasion $t_1$ may include the delay information related to the value corresponding to $\tau_1$ of FIG. 8 (for example, DI indicating 1 or 5), and the coefficient information related to the value corresponding to $g_1$ of FIG. 8 (for example, DMI/PMI indicating 1 or 0.4518+0.7745i).

Each of the wideband information #3 and #4 that is reported at the CSI reporting occasion $t_2$ may include the delay information related to the value corresponding to $\tau_2$ of FIG. 8 (for example, DI indicating 16 or 25), and the coefficient information related to the value corresponding to $g_2$ of FIG. 8 (for example, DMI/PMI indicating 0.4524−0.5749i or 0.2459+0.5596i).

As shown in FIG. 8, in the second wideband feedback type (Q=4), it is possible to reduce the UL overhead in comparison with the first wideband feedback type (Q=4) while obtaining a gain of the data rate similar to the first wideband feedback type (Q=4).

As shown in FIG. 7C, in the second wideband feedback type (Q=4), the UE may perform channel estimation at each CSI reporting occasion (the first channel estimation), or may perform channel estimation at each of a plurality of CSI reporting occasions (for example, at each of CSI reporting occasions having the number that is equal to the total number of delays Q) (the second channel estimation).

Figure 9A:
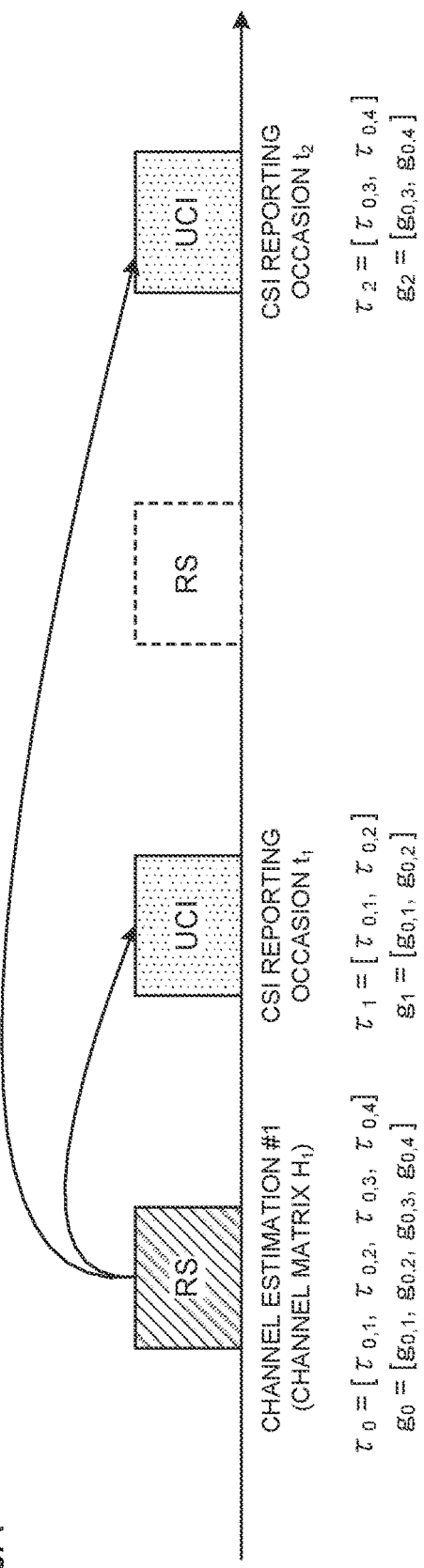
FIGS. 9A and 9B are diagrams to show examples of the second wideband feedback type according to the second aspect.
Figure 9B:
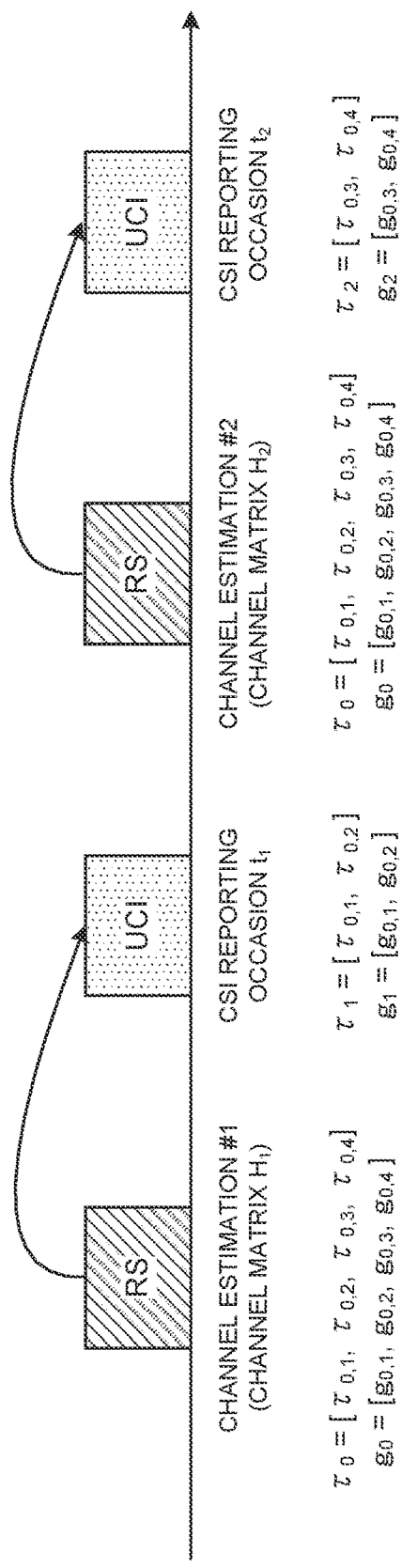

FIGS. 9A and 9B are diagrams to show examples of the second wideband feedback type according to the second aspect. In FIGS. 9A and 9B, suppose that the wideband information that is equal to the total number of delays Q is fed back while dispersed to T times of CSI reporting occasions. For example, in FIGS. 9A and 9B, because Q=4 and T=2, the wideband information #1 and #2, and #3 and #4 are fed back at the CSI reporting occasions $t_1$ and $t_2$, respectively (see FIG. 7C).

In FIG. 9A, an example in which channel estimation is performed at each of more than T times of CSI reporting occasions is shown (the first channel estimation). As shown in FIG. 9A, the UE may generate wideband information (for example, delay information $\tau_0$ and coefficient information $g_0$) having the number that is equal to the total number of delays $Q_0$ (for example, $Q_0$=4 in FIG. 9A) based on the result of channel estimation #1 (channel matrix $H_1$).

Wideband information corresponding to i-th (for example, 1<=i<=Q) delay $\tau_{0, i}$ may include delay information (for example, DI) indicating i-th delay $\tau_{0, i}$ and coefficient information (for example, DMI/PMI) indicating i-th coefficient $g_{0, i}$.

For example, in the CSI reporting occasion $t_1$ of FIG. 9A, among four delays estimated in the channel estimation #1, the delay information $\tau_1$ indicating the first two delays $\tau_{0, 1}$ and $\tau_{0, 2}$ and the coefficient information $g_1$ indicating the coefficient $g_{0, 1}$ and $g_{0, 2}$ are fed back. The delay information $\tau_1$ and the coefficient information $g_1$ may be fed back as the wideband information #1 and #2 of FIG. 7C.

In the CSI reporting occasion $t_2$ of FIG. 9A, among four delays estimated in the channel estimation #1, the delay information $\tau_2$ indicating the remaining two delays $\tau_{0, 3}$ and $\tau_{0, 4}$ and the coefficient information $g_2$ indicating the coefficient $g_{0, 3}$ and $g_{0, 4}$ are fed back. The delay information $\tau_2$ and the coefficient information $g_2$ may be fed back as the wideband information #3 and #4 of FIG. 7C.

In FIG. 9A, it is not necessary to perform channel estimation for each CSI reporting occasion. Therefore, it is possible to reduce the downlink overhead of the RS for the channel estimation.

In FIG. 9B, an example in which channel estimation is performed at each CSI reporting occasion is shown (the second channel estimation). FIG. 9B is different from FIG. 9A in that the UE also performs channel estimation #2 before the CSI reporting occasion $t_2$. In FIG. 9B, differences from FIG. 9A will be mainly described. The CSI reporting occasion $t_1$ of FIG. 9B is the same as the CSI reporting occasion $t_1$ of FIG. 9A.

For example, in FIG. 9B, the UE performs channel estimation #2 before the CSI reporting occasion $t_2$ after the CSI reporting occasion $t_1$. The UE may regenerate (update) wideband information (for example, delay information $\tau_0$ and coefficient information $g_0$) having the number that is equal to the total number of delays $Q_0$ (for example, $Q_0$=4 in FIG. 9B) based on the result of channel estimation #2 (channel matrix $H_2$). The UE may update the delay information $\tau_0$ and the coefficient information $g_0$ based on the delay information $\tau_1$ and the coefficient information $g_1$ fed back at the CSI reporting occasion $t_1$ in addition to the result of the channel estimation #2.

In the CSI reporting occasion $t_2$ of FIG. 9B, the delay information $\tau_2$ indicating the updated delays $\tau_{0, 3}$ and $\tau_{0, 4}$ and the coefficient information $g_2$ indicating the coefficient $g_{0, 3}$ and $g_{0, 4}$ may be fed back. The delay information $\tau_2$ and the coefficient information $g_2$ may be fed back as the wideband information #3 and #4 of FIG. 7C.

In FIG. 9B, channel estimation is performed for each CSI reporting occasion. Therefore, it is possible to feed back wideband information (for example, at least one of delay information and coefficient information) that reflects a current channel state, and it is possible to improve the spectral efficiency.

Note that, in FIGS. 9A and 9B, the number of times T of the CSI feedback that the delay information and the coefficient information of all Q delays τ are fed back is T=2, but the present invention is not limited to this.

In the case of T=2, as shown in FIG. 9A, the UE may feed back delay information and coefficient information of a part of the Q delays at the CSI reporting occasion #i−1 right before, and may feed back delay information and coefficient information of the rest of the Q delays at the current CSI reporting occasion #i. In FIGS. 9A and 9B, the number of pieces of wideband information (in other words, delays) fed back at each CSI reporting occasion is two, but the present invention is not limited to this.

FIGS. 10A and 10B are diagrams to show other examples of incremental feedback according to the second aspect. In FIGS. 10A and 10B, suppose that the wideband information that is equal to the total number of delays Q is fed back while dispersed to T (T>2) times of CSI reporting occasions.

For example, in FIGS. 10A and 10B, because Q=4 and T=3, the wideband information #1 and #2 are fed back at the CSI reporting occasions $t_1$ and $t_2$, respectively, and the wideband information #3 and #4 are fed back at the CSI reporting occasion $t_3$. In the following, differences from FIGS. 9A and 9B will be mainly described.

In FIG. 10A, similarly to FIG. 9A, an example in which channel estimation is not performed at each CSI reporting occasion is shown (the first channel estimation). In other words, in FIG. 10A, wideband information corresponding to $Q_0$ delays (here, $Q_0=4$) is generated based on results of the same channel estimation and is reported in a plurality of CSI reporting occasions.

For example, in FIG. 10A, the UE may generate the delay information $\tau_0$ indicating the delay $\tau_{0,\,i}$ and the coefficient information $g_0$ indicating the coefficient $g_{0,\,i}$ based on the result of the channel estimation #1 (channel matrix $H_1$). Here, i is $1<=i<=Q_0$ (or $0<=i<=Q_0-1$), and, for example, in FIG. 10A, $Q_0$ may be $Q_0=4$.

For example, as shown in FIG. 10A, at the CSI reporting occasion $t_1$, the delay information $\tau_1$ indicating the delay $\tau_{0,\,1}$ and the coefficient information $g_1$ indicating the coefficient $g_{0,\,1}$ may be fed back as the wideband information #1. At the CSI reporting occasion $t_2$, the delay information $\tau_2$ indicating the delay $\tau_{0,\,2}$ and the coefficient information $g_2$ indicating the coefficient $g_{0,\,2}$ may be fed back as the wideband information #2. In the CSI reporting occasion $t_3$, the delay information $\tau_3$ indicating the delays $\tau_{0,\,3}$ and $\tau_{0,\,4}$ and the coefficient information $g_3$ indicating the coefficient $g_{0,\,3}$ and $g_{0,\,4}$ may be fed back as the wideband information #3 and #4.

As shown in FIG. 10A, the number of delays (wideband information) reported in each of T times of CSI reporting occasions does not need to be equal. The number of delays may be determined based on the total number of the delays Q and the number of CSI reporting occasions T used for the reporting of the Q pieces of wideband information.

In the case of T>2 shown in FIG. 10A, if the total number of delays Q is equal, the UL overhead of one CSI reporting occasion (for example, CSI reporting occasions $t_1$ and $t_2$ of FIG. 10A) may be reduced in comparison with the case of T=2 shown in FIG. 9A.

Note that even in the case of T>2, as shown in FIG. 10B, channel estimation may be performed for each CSI reporting occasion. The UE operation in the channel estimations #2 and #3 of FIG. 10B is similar to the channel estimation #2 of FIG. 9B.

In the second wideband feedback type as described above, the precoder may be produced based on Q pieces of wideband information fed back at T times of CSI reporting occasions.

Particularly, a precoder (codebook) d of the frequency domain at the CSI reporting occasion #i may be determined based on a precoder $d_{old}$ of the frequency domain at the CSI reporting occasion #i−1. For example, the precoder d may be represented by the following Expression 15.

[Math. 12]

$$d = d_{old} + f(g, \tau) \in \mathbb{C}^{N \times 1} \qquad \text{Expression (15)}$$

Here, g may be coefficient information g fed back at CSI reporting occasion #i. $\tau$ may be delay information $\tau$ fed back at CSI reporting occasion #i. For example, f (g, $\tau$) may be determined by using the above Expression 12.

The precoder $d_{old}$ of the frequency domain may be determined based on delay information $\tau$ and coefficient information g fed back at CSI reporting occasion #i−1. For example, $d_{old}$ may be determined by using the above Expression 12.

For example, as shown in FIGS. 9A and 9B, a case is assumed in which the delay information $\tau_1$ and the coefficient information $g_1$ are reported at the CSI reporting occasion $t_1$, and the delay information $\tau_2$ and the coefficient information $g_2$ are reported at the CSI reporting occasion $t_2$.

In this case, $d_{old}$ may be determined based on the delay information $\tau_1$ and the coefficient information $g_1$ (for example, by using f ($\tau_1$, $g_1$) of Expression 12). The precoder d in the frequency domain may be determined based on $d_{old}$, the delay information $\tau_2$, and the coefficient information $g_2$. For example, the precoder d in the frequency domain may be determined by d=$d_{old}$+f ($\tau_2$, $g_2$) by using Expression 15. Expression 12 may be used for f ($\tau_2$, $g_2$).

In the second aspect, because a plurality of pieces of wideband information corresponding to a plurality of delays are fed back while dispersed to a plurality of different CSI reporting occasions, even if the total number of delays Q increases, it is possible to suppress the increase of the UL overhead.

(Third Aspect)

In Rel. 15 NR, the report quantity information may indicate one of 'none', 'cri-RI-PMI-CQI', 'cri-RI-i1', 'cri-RI-i1-CQI', 'cri-RI-CQI', 'cri-RSRP', 'ssb-Index-RSRP', and 'cri-RI-LI-PMI-CQI'. The UE may determine which CSI parameter to report based on the report quantity information. In the third aspect, the report quantity information may be indicatable of at least one of 'DMI-DI' (DMI and DI), 'PMI-DI' (PMI and DI), 'DI' (DI), 'DMI' (DMI), and 'PMI' (PMI).

In the third aspect, the UE may receive information indicating at least one feedback (reporting) of the above-described delay information $\tau$ and the coefficient information g. For example, the information may be the above-described report quantity information (for example, "reportQuantity" of the RRC IE).

The above-described first wideband feedback type (for example, FIGS. 7A and 7B) and the second wideband feedback type (for example, FIG. 7C) may be switched.

For example, the above-described report quantity information (for example, reportQuantity of the RRC IE) may indicate a wideband feedback type (for example, one of the above-described first or second wideband feedback type). Particularly, the report quantity information may be indicatable of at least one of 'DMI/PMI-DI-new' (feeding back the DMI/PMI and the DI by the first wideband feedback type), and 'DMI/PMI-DI-inc' (feeding back the DMI/PMI and the DI by the second wideband feedback type).

Alternatively, the UE may receive information (type information) about which wideband feedback type to apply and control the switching of the first or second wideband feedback type based on the type information independently of the report quantity information.

The above-described report quantity information and the type information may be reported by at least one of higher layer signaling (for example, RRC signaling) and the physical layer signaling (for example, DCI) to the UE. For example, the above-described report quantity information and the type information may be included in the above-described report configuration information (for example, "CSI-ReportConfig" of the RRC IE).

In the third aspect, the UE can appropriately control feedback of at least one of the delay information $\tau$ and the coefficient information g based on the indication information (for example, the above-described report quantity information) from the base station. The UE can appropriately control configuration of the first or second wideband feedback based on the indication information (for example, the above-described report quantity information or type information) from the base station.

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 11:
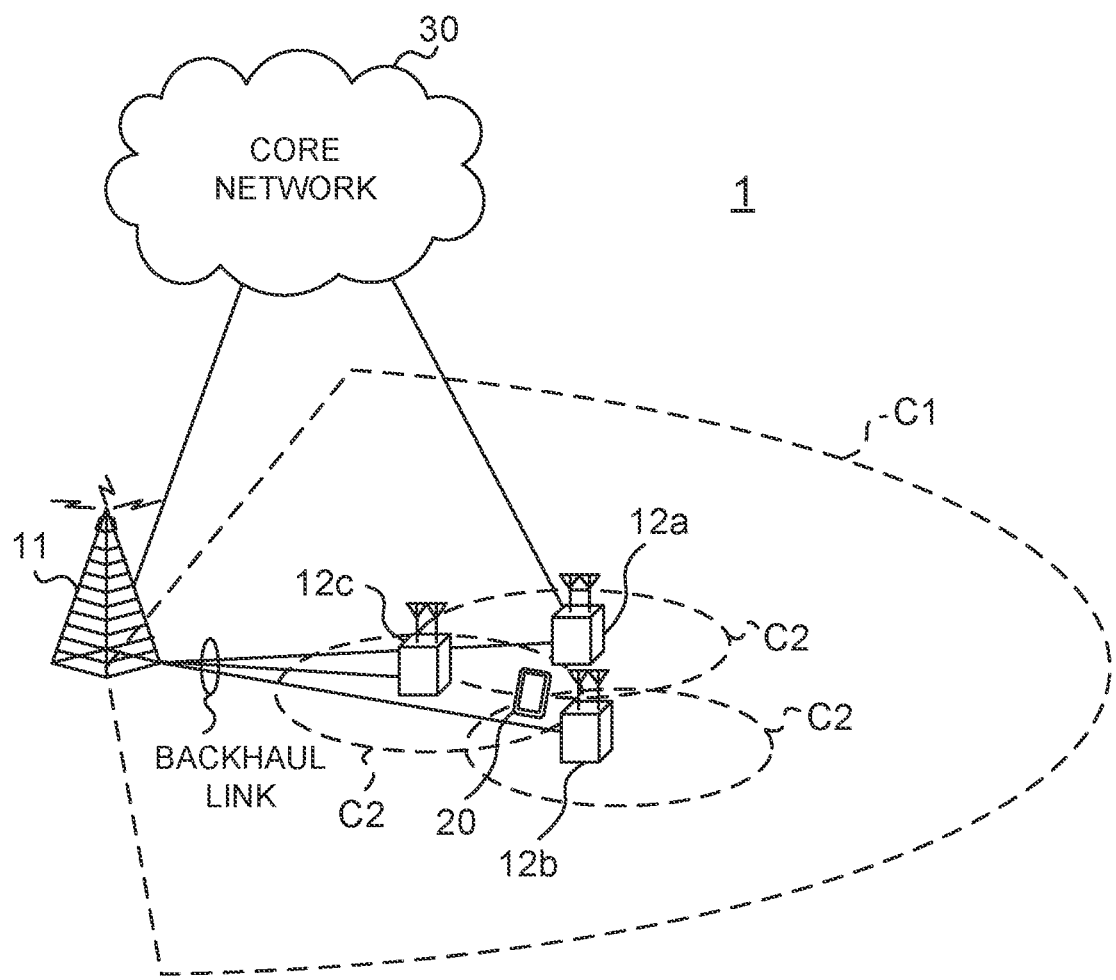
FIG. 11 is a diagram to show an example of a schematic structure of a radio communication system according to one embodiment.

FIG. 11 is a diagram to show an example of a schematic structure of the radio communication system according to one embodiment. The radio communication system 1 may be a system implementing a communication using Long Term Evolution (LTE), 5th generation mobile communication system New Radio (5G NR) and so on the specifications of which have been drafted by Third Generation Partnership Project (3GPP).

The radio communication system 1 may support dual connectivity (multi-RAT dual connectivity (MR-DC)) between a plurality of Radio Access Technologies (RATs). The MR-DC may include dual connectivity (E-UTRA-NR Dual Connectivity (EN-DC)) between LTE (Evolved Universal Terrestrial Radio Access (E-UTRA)) and NR, dual connectivity (NR-E-UTRA Dual Connectivity (NE-DC)) between NR and LTE, and so on.

In EN-DC, a base station (eNB) of LTE (E-UTRA) is a master node (MN), and a base station (gNB) of NR is a secondary node (SN). In NE-DC, a base station (gNB) of NR is an MN, and a base station (eNB) of LTE (E-UTRA) is an SN.

The radio communication system 1 may support dual connectivity between a plurality of base stations in the same RAT (for example, dual connectivity (NR-NR Dual Connectivity (NN-DC)) where both of an MN and an SN are base stations (gNB) of NR).

The radio communication system 1 may include a base station 11 that forms a macro cell C1 of a relatively wide coverage, and base stations 12 (12a to 12c) that form small cells C2, which are placed within the macro cell C1 and which are narrower than the macro cell C1. The user terminal 20 may be located in at least one cell. The arrangement, the number, and the like of each cell and user terminal 20 are by no means limited to the aspect shown in the diagram. Hereinafter, the base stations 11 and 12 will be collectively referred to as "base stations 10," unless specified otherwise.

The user terminal 20 may be connected to at least one of the plurality of base stations 10. The user terminal 20 may use at least one of carrier aggregation and dual connectivity (DC) using a plurality of component carriers (CCs).

Each CC may be included in at least one of a first frequency band (Frequency Range 1 (FR1)) and a second frequency band (Frequency Range 2 (FR2)). The macro cell C1 may be included in FR1, and the small cells C2 may be included in FR2. For example, FR1 may be a frequency band of 6 GHz or less (sub-6 GHz), and FR2 may be a frequency band which is higher than 24 GHz (above-24 GHz). Note that frequency bands, definitions and so on of FR1 and FR2 are by no means limited to these, and for example, FR1 may correspond to a frequency band which is higher than FR2.

The user terminal 20 may communicate using at least one of time division duplex (TDD) and frequency division duplex (FDD) in each CC.

The plurality of base stations 10 may be connected by a wired connection (for example, optical fiber in compliance with the Common Public Radio Interface (CPRI), the X2 interface and so on) or a wireless connection (for example, an NR communication). For example, if an NR communication is used as a backhaul between the base stations 11 and 12, the base station 11 corresponding to a higher station may be referred to as an "Integrated Access Backhaul (IAB) donor," and the base station 12 corresponding to a relay station (relay) may be referred to as an "IAB node."

The base station 10 may be connected to a core network 30 through another base station 10 or directly. For example, the core network 30 may include at least one of Evolved Packet Core (EPC), 5G Core Network (5GCN), Next Generation Core (NGC), and so on.

The user terminal 20 may be a terminal supporting at least one of communication schemes such as LTE, LTE-A, 5G, and so on.

In the radio communication system 1, an orthogonal frequency division multiplexing (OFDM)-based wireless access scheme may be used. For example, in at least one of the downlink (DL) and the uplink (UL), Cyclic Prefix OFDM (CP-OFDM), Discrete Fourier Transform Spread OFDM (DFT-s-OFDM), Orthogonal Frequency Division Multiple Access (OFDMA), Single Carrier Frequency Division Multiple Access (SC-FDMA), and so on may be used.

The wireless access scheme may be referred to as a "waveform." Note that, in the radio communication system 1, another wireless access scheme (for example, another single carrier transmission scheme, another multi-carrier transmission scheme) may be used for a wireless access scheme in the UL and the DL.

In the radio communication system 1, a downlink shared channel (Physical Downlink Shared Channel (PDSCH)), which is used by each user terminal 20 on a shared basis, a broadcast channel (Physical Broadcast Channel (PBCH)), a downlink control channel (Physical Downlink Control Channel (PDCCH)) and so on, may be used as downlink channels.

In the radio communication system 1, an uplink shared channel (Physical Uplink Shared Channel (PUSCH)), which is used by each user terminal 20 on a shared basis, an uplink control channel (Physical Uplink Control Channel (PUCCH)), a random access channel (Physical Random Access Channel (PRACH)) and so on may be used as uplink channels.

User data, higher layer control information, System Information Blocks (SIBs) and so on are communicated on the PDSCH. User data, higher layer control information and so on may be communicated on the PUSCH. The Master Information Blocks (MIBs) may be communicated on the PBCH.

Lower layer control information is communicated on the PDCCH. For example, the lower layer control information may include downlink control information (DCI) including scheduling information of at least one of the PDSCH and the PUSCH.

Note that DCI for scheduling the PDSCH may be referred to as "DL assignment," "DL DCI," and so on, and DCI for scheduling the PUSCH may be referred to as "UL grant," "UL DCI," and so on. Note that the PDSCH may be interpreted as "DL data", and the PUSCH may be interpreted as "UL data".

For detection of the PDCCH, a control resource set (CORESET) and a search space may be used. The CORESET corresponds to a resource to search DCI. The search space corresponds to a search area and a search method of PDCCH candidates. One CORESET may be associated with one or more search spaces. The UE may monitor a CORESET associated with a given search space, based on search space configuration.

One search space may correspond to a PDCCH candidate corresponding to one or more aggregation levels. One or more search spaces may be referred to as a "search space set." Note that a "search space," a "search space set," a "search space configuration," a "search space set configuration," a "CORESET," a "CORESET configuration" and so on of the present disclosure may be interchangeably interpreted.

Uplink control information (UCI) including at least one of channel state information (CSI), transmission confirmation information (for example, which may be also referred to as Hybrid Automatic Repeat reQuest ACKnowledgement (HARQ-ACK), ACK/NACK, and so on), and scheduling request (SR) may be communicated by means of the PUCCH. By means of the PRACH, random access preambles for establishing connections with cells may be communicated.

Note that the downlink, the uplink, and so on in the present disclosure may be expressed without a term of "link." In addition, various channels may be expressed without adding "Physical" to the head.

In the radio communication system 1, a synchronization signal (SS), a downlink reference signal (DL-RS), and so on may be communicated. In the radio communication system 1, a cell-specific reference signal (CRS), a channel state information-reference signal (CSI-RS), a demodulation reference signal (DMRS), a positioning reference signal (PRS), a phase tracking reference signal (PTRS), and so on are communicated as the DL-RS.

For example, the synchronization signal may be at least one of a primary synchronization signal (PSS) and a secondary synchronization signal (SSS). A signal block including an SS (PSS, SSS) and a PBCH (and a DMRS for a PBCH) may be referred to as an "SS/PBCH block," an "SS Block (SSB)," and so on. Note that an SS, an SSB, and so on may be also referred to as a "reference signal."

In the radio communication system 1, a sounding reference signal (SRS), a demodulation reference signal (DMRS), and so on may be communicated as an uplink reference signal (UL-RS). Note that DMRS may be referred to as a "user terminal specific reference signal (UE-specific Reference Signal)."

(Base Station)

Figure 12:
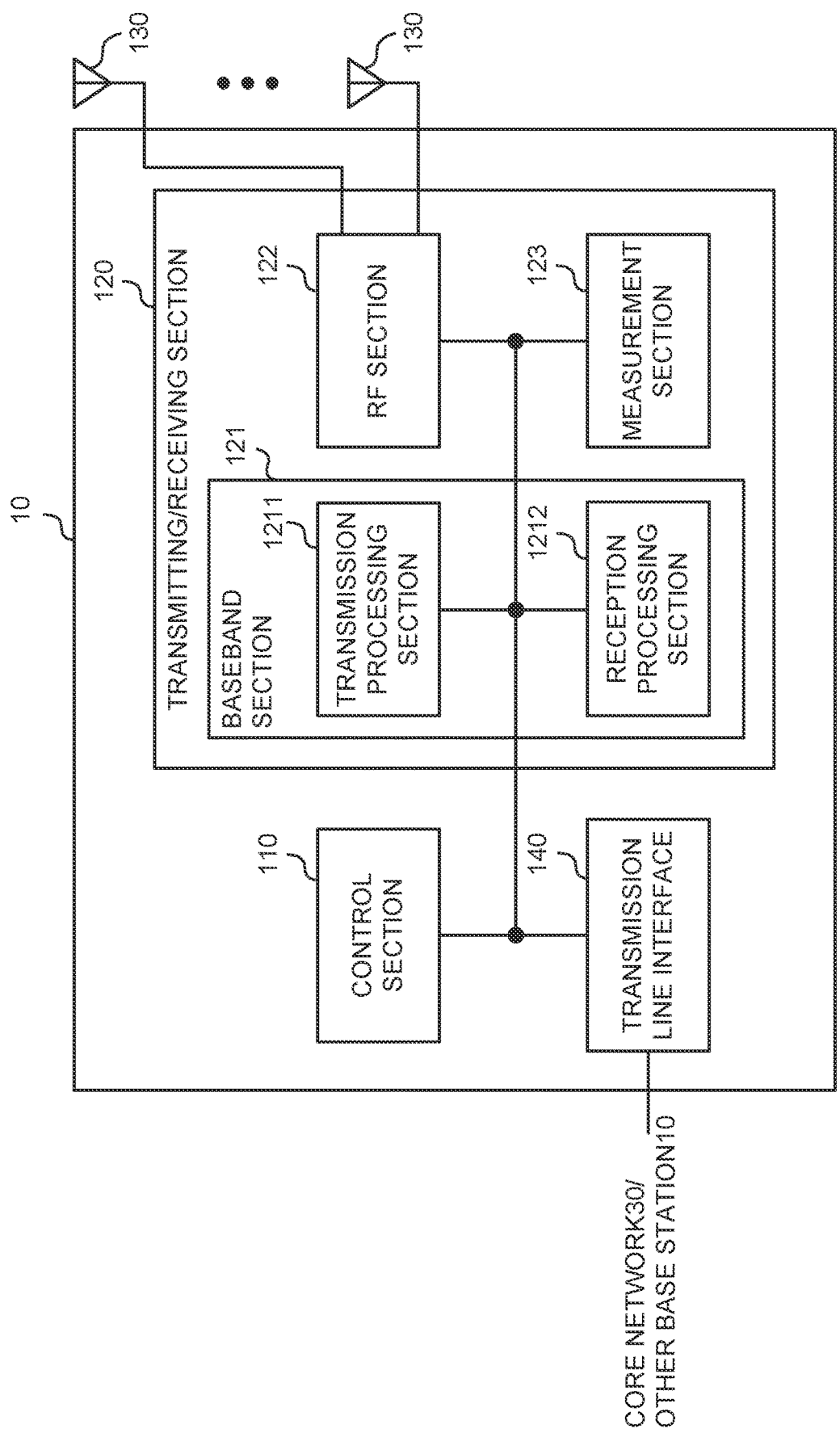
FIG. 12 is a diagram to show an example of a structure of a base station according to one embodiment.

FIG. 12 is a diagram to show an example of a structure of the base station according to one embodiment. The base station 10 includes a control section 110, a transmitting/receiving section 120, transmitting/receiving antennas 130 and a communication path interface (transmission line interface) 140. Note that the base station 10 may include one or more control sections 110, one or more transmitting/receiving sections 120, one or more transmitting/receiving antennas 130, and one or more communication path interfaces 140.

Note that, the present example primarily shows functional blocks that pertain to characteristic parts of the present embodiment, and it is assumed that the base station 10 may include other functional blocks that are necessary for radio communication as well. Part of the processes of each section described below may be omitted.

The control section 110 controls the whole of the base station 10. The control section 110 can be constituted with a controller, a control circuit, or the like described based on general understanding of the technical field to which the present disclosure pertains.

The control section 110 may control generation of signals, scheduling (for example, resource allocation, mapping), and so on. The control section 110 may control transmission and reception, measurement and so on using the transmitting/receiving section 120, the transmitting/receiving antennas 130, and the communication path interface 140. The control section 110 may generate data, control information, a sequence and so on to transmit as a signal, and forward the generated items to the transmitting/receiving section 120. The control section 110 may perform call processing (setting up, releasing) for communication channels, manage the state of the base station 10, and manage the radio resources.

The transmitting/receiving section 120 may include a baseband section 121, a Radio Frequency (RF) section 122, and a measurement section 123. The baseband section 121 may include a transmission processing section 1211 and a reception processing section 1212. The transmitting/receiving section 120 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 120 may be structured as a transmitting/receiving section in one entity, or may be constituted with a transmitting section and a receiving section. The transmitting section may be constituted with the transmission processing section 1211, and the RF section 122. The receiving section may be constituted with the reception processing section 1212, the RF section 122, and the measurement section 123.

The transmitting/receiving antennas 130 can be constituted with antennas, for example, an array antenna, or the like described based on general understanding of the technical field to which the present disclosure pertains.

The transmitting/receiving section 120 may transmit the above-described downlink channel, synchronization signal, downlink reference signal, and so on. The transmitting/receiving section 120 may receive the above-described uplink channel, uplink reference signal, and so on.

The transmitting/receiving section 120 may form at least one of a transmission beam and a reception beam by using digital beam foaming (for example, precoding), analog beam foaming (for example, phase rotation), and so on.

The transmitting/receiving section 120 (transmission processing section 1211) may perform the processing of the Packet Data Convergence Protocol (PDCP) layer, the processing of the Radio Link Control (RLC) layer (for example, RLC retransmission control), the processing of the Medium Access Control (MAC) layer (for example, HARQ retransmission control), and so on, for example, on data and control information and so on acquired from the control section 110, and may generate bit string to transmit.

The transmitting/receiving section 120 (transmission processing section 1211) may perform transmission processing such as channel coding (which may include error correction coding), modulation, mapping, filtering, discrete Fourier transform (DFT) processing (as necessary), inverse fast Fourier transform (IFFT) processing, precoding, digital-to-analog conversion, and so on, on the bit string to transmit, and output a baseband signal.

The transmitting/receiving section 120 (RF section 122) may perform modulation to a radio frequency band, filtering, amplification, and so on, on the baseband signal, and transmit the signal of the radio frequency band through the transmitting/receiving antennas 130.

On the other hand, the transmitting/receiving section 120 (RF section 122) may perform amplification, filtering, demodulation to a baseband signal, and so on, on the signal of the radio frequency band received by the transmitting/receiving antennas 130.

The transmitting/receiving section 120 (reception processing section 1212) may apply reception processing such as analog-digital conversion, fast Fourier transform (FFT) processing, inverse discrete Fourier transform (IDFT) processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 120 (measurement section 123) may perform the measurement related to the received signal. For example, the measurement section 123 may perform Radio Resource Management (RRM) measurement, Channel State Information (CSI) measurement, and so on, based on the received signal. The measurement section 123 may measure a received power (for example, Reference Signal Received Power (RSRP)), a received quality (for example, Reference Signal Received Quality (RSRQ), a Signal to Interference plus Noise Ratio (SINR), a Signal to Noise Ratio (SNR)), a signal strength (for example, Received Signal Strength Indicator (RSSI)), channel information (for example, CSI), and so on. The measurement results may be output to the control section 110.

The communication path interface 140 may perform transmission/reception (backhaul signaling) of a signal with an apparatus included in the core network 30 or other base stations 10, and so on, and acquire or transmit user data (user plane data), control plane data, and so on for the user terminal 20.

Note that the transmitting section and the receiving section of the base station 10 in the present disclosure may be constituted with at least one of the transmitting/receiving section 120, the transmitting/receiving antennas 130, and the communication path interface 140.

Note that the transmitting/receiving section 120 may transmit configuration information (report configuration information) about channel state information (CSI) reporting.

The control section 110 may control reception of information related to the wideband including at least one of information related to the delay and information related to the coefficient corresponding to the delay based on the configuration information (for example, FIGS. 3, 4 and 5).

The information related to the coefficient may indicate the quantized amplitude and phase of the coefficient, the coefficient quantized based on a modulation order, or a vector selected from a codebook.

The control section 110 may control the generation of the precoder in the frequency domain based on the above-described wideband information. The control section 110 may control the transmission of the downlink signal (for example, PDSCH) based on the precoder.

(User Terminal)

Figure 13:
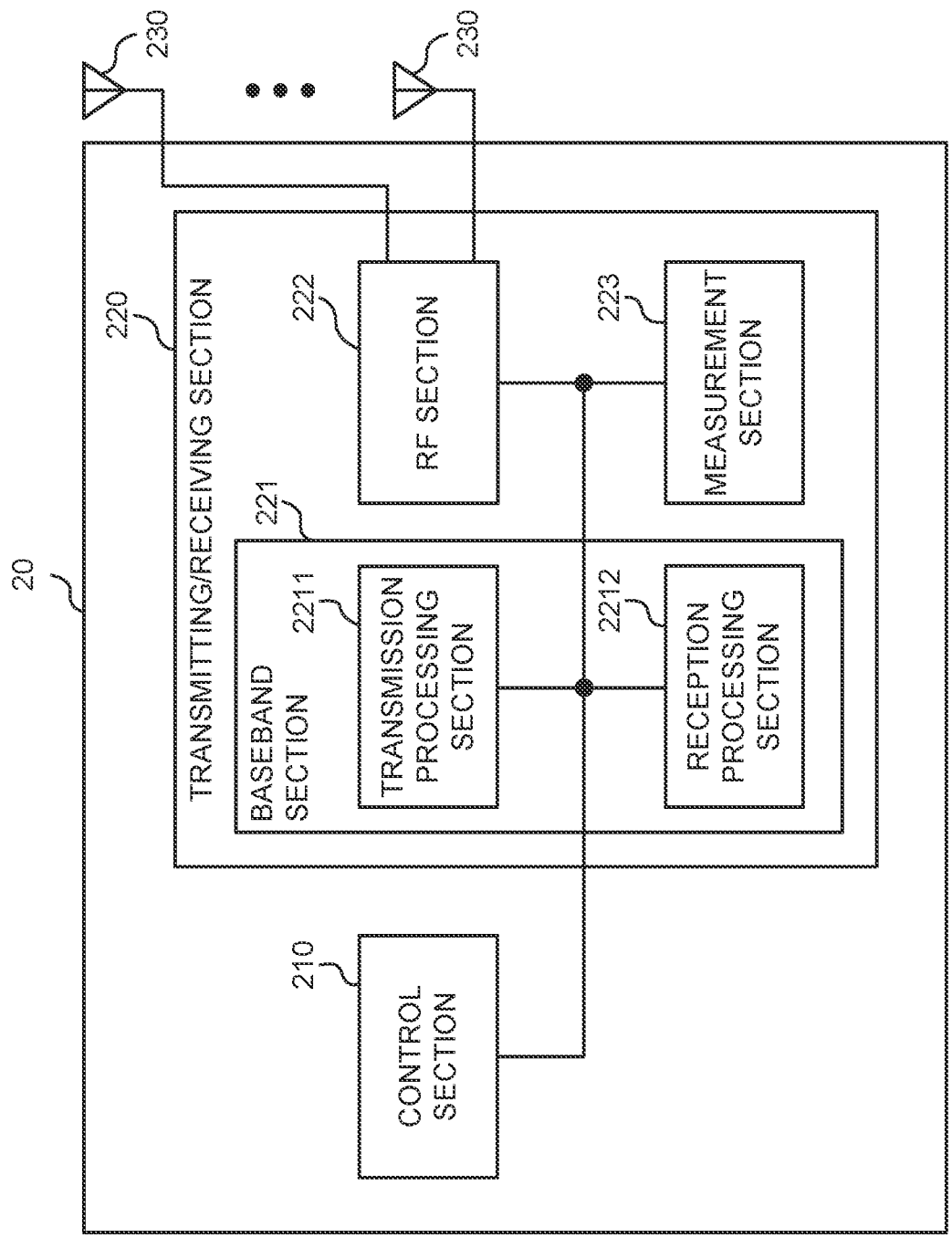
FIG. 13 is a diagram to show an example of a structure of a user terminal according to one embodiment.

FIG. 13 is a diagram to show an example of a structure of the user terminal according to one embodiment. The user terminal 20 includes a control section 210, a transmitting/receiving section 220, and transmitting/receiving antennas 230. Note that the user terminal 20 may include one or more control sections 210, one or more transmitting/receiving sections 220, and one or more transmitting/receiving antennas 230.

Note that, the present example primarily shows functional blocks that pertain to characteristic parts of the present embodiment, and it is assumed that the user terminal 20 may include other functional blocks that are necessary for radio communication as well. Part of the processes of each section described below may be omitted.

The control section 210 controls the whole of the user terminal 20. The control section 210 can be constituted with a controller, a control circuit, or the like described based on general understanding of the technical field to which the present disclosure pertains.

The control section 210 may control generation of signals, mapping, and so on. The control section 210 may control transmission/reception, measurement and so on using the transmitting/receiving section 220, and the transmitting/receiving antennas 230. The control section 210 generates data, control information, a sequence and so on to transmit as a signal, and may forward the generated items to the transmitting/receiving section 220.

The transmitting/receiving section 220 may include a baseband section 221, an RF section 222, and a measurement section 223. The baseband section 221 may include a transmission processing section 2211 and a reception processing section 2212. The transmitting/receiving section 220 can be constituted with a transmitter/receiver, an RF circuit, a baseband circuit, a filter, a phase shifter, a measurement circuit, a transmitting/receiving circuit, or the like described based on general understanding of the technical field to which the present disclosure pertains.

The transmitting/receiving section 220 may be structured as a transmitting/receiving section in one entity, or may be constituted with a transmitting section and a receiving section. The transmitting section may be constituted with the transmission processing section 2211, and the RF section 222. The receiving section may be constituted with the reception processing section 2212, the RF section 222, and the measurement section 223.

The transmitting/receiving antennas 230 can be constituted with antennas, for example, an array antenna, or the like described based on general understanding of the technical field to which the present disclosure pertains.

The transmitting/receiving section 220 may receive the above-described downlink channel, synchronization signal, downlink reference signal, and so on. The transmitting/receiving section 220 may transmit the above-described uplink channel, uplink reference signal, and so on.

The transmitting/receiving section 220 may form at least one of a transmission beam and a reception beam by using digital beam foaming (for example, precoding), analog beam foaming (for example, phase rotation), and so on.

The transmitting/receiving section 220 (transmission processing section 2211) may perform the processing of the PDCP layer, the processing of the RLC layer (for example, RLC retransmission control), the processing of the MAC layer (for example, HARQ retransmission control), and so on, for example, on data and control information and so on acquired from the control section 210, and may generate bit string to transmit.

The transmitting/receiving section 220 (transmission processing section 2211) may perform transmission processing such as channel coding (which may include error correction coding), modulation, mapping, filtering, DFT processing (as necessary), IFFT processing, precoding, digital-to-analog conversion, and so on, on the bit string to transmit, and output a baseband signal.

Note that, whether to apply DFT processing or not may be based on the configuration of the transform precoding. The transmitting/receiving section 220 (transmission processing section 2211) may perform, for a given channel (for example, PUSCH), the DFT processing as the above-described transmission processing to transmit the channel by using a DFT-s-OFDM waveform if transform precoding is enabled, and otherwise, does not need to perform the DFT processing as the above-described transmission process.

The transmitting/receiving section 220 (RF section 222) may perform modulation to a radio frequency band, filtering, amplification, and so on, on the baseband signal, and transmit the signal of the radio frequency band through the transmitting/receiving antennas 230.

On the other hand, the transmitting/receiving section 220 (RF section 222) may perform amplification, filtering, demodulation to a baseband signal, and so on, on the signal of the radio frequency band received by the transmitting/receiving antennas 230.

The transmitting/receiving section 220 (reception processing section 2212) may apply a receiving process such as analog-digital conversion, FFT processing, IDFT processing (as necessary), filtering, de-mapping, demodulation, decoding (which may include error correction decoding), MAC layer processing, the processing of the RLC layer and the processing of the PDCP layer, and so on, on the acquired baseband signal, and acquire user data, and so on.

The transmitting/receiving section 220 (measurement section 223) may perform the measurement related to the received signal. For example, the measurement section 223 may perform RRM measurement, CSI measurement, and so on, based on the received signal. The measurement section 223 may measure a received power (for example, RSRP), a received quality (for example, RSRQ, SINR, SNR), a signal strength (for example, RSSI), channel information (for example, CSI), and so on. The measurement results may be output to the control section 210.

Note that the transmitting section and the receiving section of the user terminal 20 in the present disclosure may be constituted with at least one of the transmitting/receiving section 220, the transmitting/receiving antennas 230, and the communication path interface 240.

Note that the transmitting/receiving section 220 may receive configuration information (report configuration information) about channel state information (CSI) reporting.

The control section 210 may control transmission of information related to the wideband including at least one of information related to the delay and information related to the coefficient corresponding to the delay based on the configuration information (for example, FIGS. 3, 4 and 5).

The information related to the coefficient may indicate the quantized amplitude and phase of the coefficient, the coefficient quantized based on a modulation order, or a vector selected from a codebook.

The coefficient may be used for the generation of the precoder in the frequency domain.

The control section 210 may control transmission of the spatial information including at least one of information related to the angle and information related to the codeword, and information related to the wideband (for example, FIG. 4).

The information related to the wideband may include at least one of the information related to the angle corresponding to the delay and the information related to the codeword corresponding to the delay (for example, FIG. 5).

The control section 210 may control transmission of a plurality of pieces of wideband information each including at least one of information related to a plurality of delays and information related to a plurality of coefficients corresponding to the delays based on the configuration information.

The control section 210 may control transmission of all of the plurality of pieces of wideband information at the same occasion (the same CSI reporting occasion) of the CSI reporting.

The control section 210 may control transmission of the plurality of pieces of wideband information dispersed at a plurality of occasions (a plurality of CSI reporting occasions) of the CSI reporting.

The control section 210 may determine the plurality of pieces of wideband information based on a channel matrix estimated before the plurality of occasions (for example, FIGS. 9A, and 10A).

The control section 210 may update a part of the plurality of pieces of wideband information based on a channel matrix estimated between the plurality of occasions (for example, FIGS. 9B, and 10B).

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus. The functional blocks may be implemented by combining softwares into the apparatus described above or the plurality of apparatuses described above.

Here, functions include judgment, determination, decision, calculation, computation, processing, derivation, investigation, search, confirmation, reception, transmission, output, access, resolution, selection, designation, establishment, comparison, assumption, expectation, considering, broadcasting, notifying, communicating, forwarding, configuring, reconfiguring, allocating (mapping), assigning, and the like, but function are by no means limited to these. For example, functional block (components) to implement a function of transmission may be referred to as a "transmitting section (transmitting unit)," a "transmitter," and the like. The method for implementing each component is not particularly limited as described above.

Figure 14:
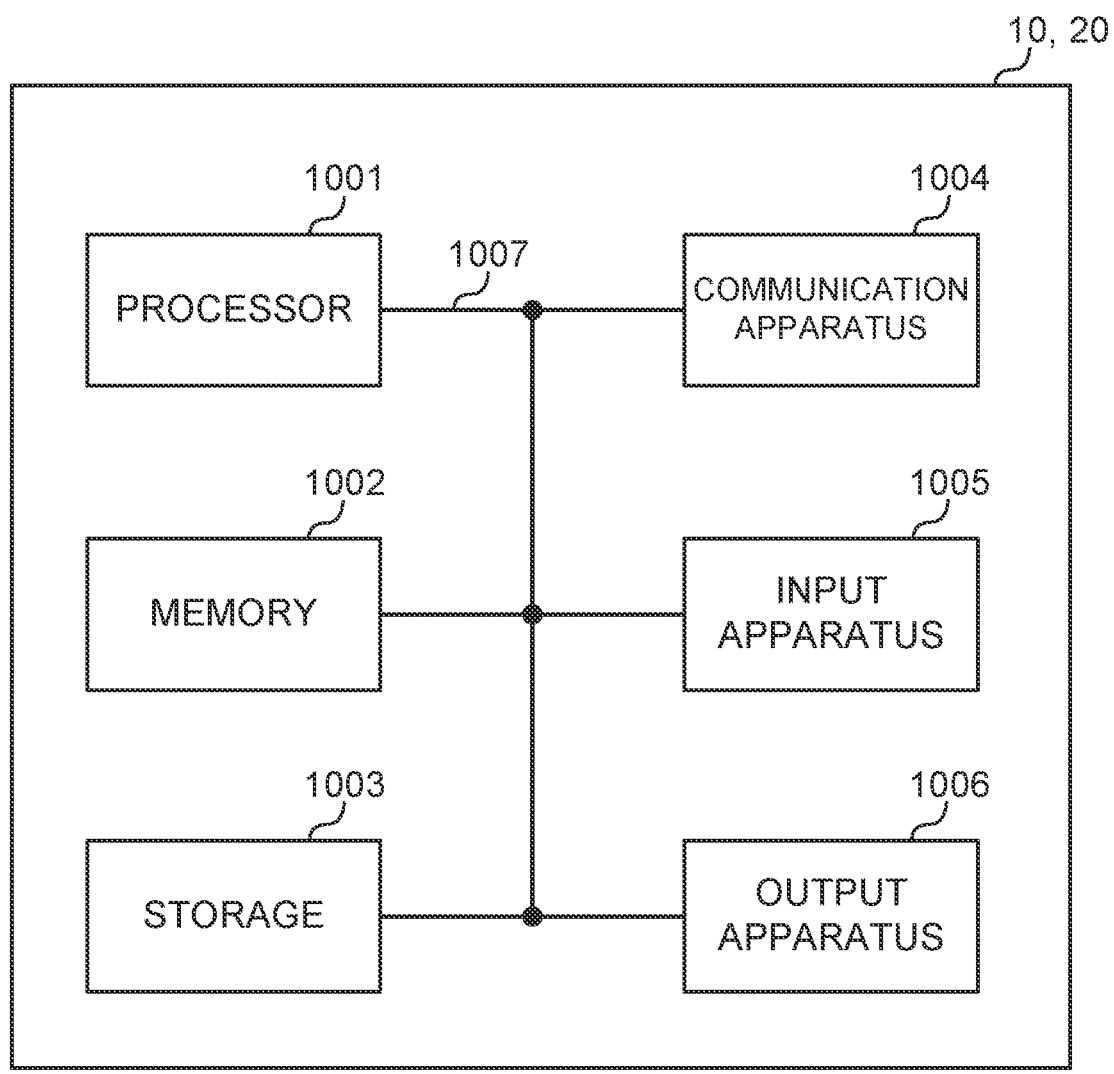
FIG. 14 is a diagram to show an example of a hardware structure of the base station and the user terminal according to one embodiment.

For example, a base station, a user terminal, and so on according to one embodiment of the present disclosure may function as a computer that executes the processes of the radio communication method of the present disclosure. FIG. 14 is a diagram to show an example of a hardware structure of the base station and the user terminal according to one embodiment. Physically, the above-described base station 10 and user terminal 20 may each be formed as computer an apparatus that includes a processor 1001, a memory 1002, a storage 1003, a communication apparatus 1004, an input apparatus 1005, an output apparatus 1006, a bus 1007, and so on.

Note that in the present disclosure, the words such as an apparatus, a circuit, a device, a section, a unit, and so on can be interchangeably interpreted. The hardware structure of the base station 10 and the user terminal 20 may be configured to include one or more of apparatuses shown in the drawings, or may be configured not to include part of apparatuses.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the base station 10 and the user terminals 20 is implemented, for example, by allowing given software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, at least part of the above-described control section 110 (210), the transmitting/receiving section 120 (220), and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used. For example, the control section 110 (210) may be implemented by control programs that are stored in the memory 1002 and that operate on the processor 1001, and other functional blocks may be implemented likewise.

The memory 1002 is a computer-readable recording medium, and may be constituted with, for example, at least one of a Read Only Memory (ROM), an Erasable Programmable ROM (EPROM), an Electrically EPROM (EEPROM), a Random Access Memory (RAM), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (Compact Disc ROM (CD-ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving section 120 (220), the transmitting/receiving antennas 130 (230), and so on may be implemented by the communication apparatus 1004. In the transmitting/receiving section 120 (220), the transmitting section 120*a* (220*a*) and the receiving section 120*b* (220*b*) can be implemented while being separated physically or logically.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, a Light Emitting Diode (LED) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the base station 10 and the user terminals 20 may be structured to include hardware such as a microprocessor, a digital signal processor (DSP), an Application Specific Integrated Circuit (ASIC), a Programmable Logic Device (PLD), a Field Programmable Gate Array (FPGA), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, a "channel," a "symbol," and a "signal" (or signaling) may be interchangeably interpreted. Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a given signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (Orthogonal Frequency Division Multiplexing (OFDM) symbols, Single Carrier Frequency Division Multiple Access (SC-FDMA) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms. Note that time units such as a frame, a subframe, a slot, mini-slot, and a symbol in the present disclosure may be interchangeably interpreted.

For example, one subframe may be referred to as a "TTI," a plurality of consecutive subframes may be referred to as a "TTI," or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a base station schedules the allocation of radio resources (such as a frequency bandwidth and transmit power that are available for each user terminal) for the user terminal in TTI units. Note that the definition of TTIs is not limited to this.

TTIs may be transmission time units for channel-encoded data packets (transport blocks), code blocks, or codewords, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in 3GPP Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain. The number of subcarriers included in an RB may be the same regardless of numerology, and, for example, may be 12. The number of subcarriers included in an RB may be determined based on numerology.

Also, an RB may include one or a plurality of symbols in the time domain, and may be one slot, one mini-slot, one subframe, or one TTI in length. One TTI, one subframe, and so on each may be constituted of one or a plurality of resource blocks.

Note that one or a plurality of RBs may be referred to as a "physical resource block (Physical RB (PRB))," a "subcarrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

A bandwidth part (BWP) (which may be referred to as a "fractional bandwidth," and so on) may represent a subset of contiguous common resource blocks (common RBs) for given numerology in a given carrier. Here, a common RB may be specified by an index of the RB based on the common reference point of the carrier. A PRB may be defined by a given BWP and may be numbered in the BWP.

The BWP may include a UL BWP (BWP for the UL) and a DL BWP (BWP for the DL). One or a plurality of BWPs may be configured in one carrier for a UE.

At least one of configured BWPs may be active, and a UE does not need to assume to transmit/receive a given signal/channel outside active BWPs. Note that a "cell," a "carrier," and so on in the present disclosure may be interpreted as a "BWP".

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to given values, or may be represented in another corresponding information. For example, radio resources may be specified by given indices.

The names used for parameters and so on in the present disclosure are in no respect limiting. Furthermore, mathematical expressions that use these parameters, and so on may be different from those expressly disclosed in the present disclosure. For example, since various channels (PUCCH, PDCCH, and so on) and information elements can be identified by any suitable names, the various names allocated to these various channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information in the present disclosure may be implemented by using physical layer signaling (for example, downlink control information (DCI), uplink control information (UCI), higher layer signaling (for example, Radio Resource Control (RRC) signaling, broadcast information (master information block (MIB), system information blocks (SIBs), and so on), Medium Access Control (MAC) signaling and so on), and other signals or combinations of these.

Note that physical layer signaling may be referred to as "Layer 1/Layer 2 (L1/L2) control information (L1/L2 control signals)," "L1 control information (L1 control signal)," and so on. Also, RRC signaling may be referred to as an "RRC message," and can be, for example, an RRC connection setup message, an RRC connection reconfiguration message, and so on. Also, MAC signaling may be reported using, for example, MAC control elements (MAC CEs).

Also, reporting of given information (for example, reporting of "X holds") does not necessarily have to be reported explicitly, and can be reported implicitly (by, for example, not reporting this given information or reporting another piece of information).

Determinations may be made in values represented by one bit (0 or 1), may be made in Boolean values that represent true or false, or may be made by comparing numerical values (for example, comparison against a given value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably. The "network" may mean an apparatus (for example, a base station) included in the network.

In the present disclosure, the terms such as "precoding," a "precoder," a "weight (precoding weight)," "quasi-co-location (QCL)," a "Transmission Configuration Indication state (TCI state)," a "spatial relation," a "spatial domain filter," a "transmit power," "phase rotation," an "antenna port," an "antenna port group," a "layer," "the number of layers," a "rank," a "resource," a "resource set," a "resource group," a "beam," a "beam width," a "beam angular degree," an "antenna," an "antenna element," a "panel," and so on can be used interchangeably.

In the present disclosure, the terms such as a "base station (BS)," a "radio base station," a "fixed station," a "NodeB," an "eNB (eNodeB)," a "gNB (gNodeB)," an "access point," a "transmission point (TP)," a "reception point (RP)," a "transmission/reception point (TRP)," a "panel," a "cell," a "sector," a "cell group," a "carrier," a "component carrier," and so on can be used interchangeably. The base station may be referred to as the terms such as a "macro cell," a small cell," a "femto cell," a "pico cell," and so on.

A base station can accommodate one or a plurality of (for example, three) cells. When a base station accommodates a plurality of cells, the entire coverage area of the base station can be partitioned into multiple smaller areas, and each smaller area can provide communication services through base station subsystems (for example, indoor small base stations (Remote Radio Heads (RRHs))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," and "terminal" may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," a "radio communication apparatus," and so on. Note that at least one of a base station and a mobile station may be device mounted on a moving object or a moving object itself, and so on. The moving object may be a vehicle (for example, a car, an airplane, and the like), may be a moving object which moves unmanned (for example, a drone, an automatic operation car, and the like), or may be a robot (a manned type or unmanned type). Note that at least one of a base station and a mobile station also includes an apparatus which does not necessarily move during communication operation. For example, at least one of a base station and a mobile station may be an Internet of Things (IoT) device such as a sensor, and the like.

Furthermore, the base station in the present disclosure may be interpreted as a user terminal. For example, each aspect/embodiment of the present disclosure may be applied to the structure that replaces a communication between a base station and a user terminal with a communication between a plurality of user terminals (for example, which may be referred to as "Device-to-Device (D2D)," "Vehicle-to-Everything (V2X)," and the like). In this case, user terminals 20 may have the functions of the base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as base station. In this case, the base station 10 may have the functions of the user terminal 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, Mobility Management Entities (MMEs), Serving-Gateways (S-GWs), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to Long Term Evolution (LTE), LTE-Advanced (LTE-A), LTE-Beyond (LTE-B), SUPER 3G, IMT-Advanced, 4th generation mobile communication system (4G), 5th generation mobile communication system (5G), Future Radio Access (FRA), New-Radio Access Technology (RAT), New Radio (NR), New radio access (NX), Future generation radio access (FX), Global System for Mobile communications (GSM (registered trademark)), CDMA 2000, Ultra Mobile Broadband (UMB), IEEE 802.11 (Wi-Fi (registered trademark)), IEEE 802.16 (WiMAX (registered trademark)), IEEE 802.20, Ultra-WideBand (UWB), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up, search and inquiry (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

"The maximum transmit power" according to the present disclosure may mean a maximum value of the transmit power, may mean the nominal maximum transmit power (the nominal UE maximum transmit power), or may mean the rated maximum transmit power (the rated UE maximum transmit power).

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables and printed electrical connections, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." Note that the phrase may mean that "A and B is each different from C." The terms "separate," "be coupled," and so on may be interpreted similarly to "different."

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
   a receiver configured to receive configuration information including a plurality of delays for reporting channel state information; and
   a processor configured to, based on the configuration information, perform channel measurement for generating a plurality of wideband information that respectively correspond to the plurality of delays, and configured to control transmission of channel state information including the plurality of wideband information,
   wherein each of the plurality of wideband information indicates quantized amplitude and phase.

2. A radio communication method for a terminal, the radio communication method comprising:
   receiving configuration information including a plurality of delays for reporting channel state information; and
   based on the configuration information, performing channel measurement for generating a plurality of wideband information that respectively correspond to the plurality of delays, and controlling transmission of channel state information including the plurality of wideband information,
   wherein each of the plurality of wideband information indicates quantized amplitude and phase.

3. A base station comprising:
a transmitter configured to transmit configuration information including a plurality of delays for reporting channel state information in order for a terminal to, based on the configuration information, perform channel measurement for generating a plurality of wideband information that respectively correspond to the plurality of delays, and control transmission of channel state information including the plurality of wideband information; and
a receiver configured to receive the transmission of channel state information, wherein each of the plurality of wideband information indicates quantized amplitude and phase.

4. A system comprising a terminal and a base station, wherein
the terminal comprises:
  a receiver configured to receive configuration information including a plurality of delays for reporting channel state information; and
  a processor configured to, based on the configuration information, perform channel measurement for generating a plurality of wideband information that respectively correspond to the plurality of delays, and configured to control transmission of channel state information including the plurality of wideband information,
  wherein each of the plurality of wideband information indicates quantized amplitude and phase, and
the base station comprises:
  a transmitter configured to transmit the configuration information.

\* \* \* \* \*